US012249266B2

(12) United States Patent
Tanaka

(10) Patent No.: US 12,249,266 B2
(45) Date of Patent: Mar. 11, 2025

(54) DRIVER CONFIGURED TO DRIVE A LIQUID CRYSTAL PANEL WITH A STATIC DRIVE SYSTEM AND ELECTRO-OPTIC DEVICE INCLUDING DRIVER

(71) Applicant: SEIKO EPSON CORPORATION, Tokyo (JP)

(72) Inventor: Kazuaki Tanaka, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 28 days.

(21) Appl. No.: 18/343,111

(22) Filed: Jun. 28, 2023

(65) Prior Publication Data

US 2024/0005834 A1 Jan. 4, 2024

(30) Foreign Application Priority Data

Jul. 1, 2022 (JP) ................................ 2022-106891

(51) Int. Cl.

*G09G 3/20* (2006.01)
*G09G 3/34* (2006.01)
*G09G 3/36* (2006.01)

(52) U.S. Cl.

CPC ......... *G09G 3/2014* (2013.01); *G09G 3/2096* (2013.01); *G09G 3/3406* (2013.01); *G09G 3/344* (2013.01); *G09G 3/36* (2013.01); *G09G 2310/0264* (2013.01)

(58) Field of Classification Search

CPC .. G09G 3/2014; G09G 3/2096; G09G 3/3406; G09G 3/344; G09G 3/36; G09G 2310/0264

See application file for complete search history.

(56) References Cited

U.S. PATENT DOCUMENTS

| | | | | |
|---|---|---|---|---|
| 6,366,026 B1 * | 4/2002 | Saito | G09G 3/3275 | 315/169.3 |
| 2003/0179221 A1 * | 9/2003 | Nitta | G09G 3/3648 | 345/690 |
| 2006/0197729 A1 | 9/2006 | Shiraishi et al. | | |
| 2012/0249508 A1 * | 10/2012 | Hsu | G09G 3/344 | 345/204 |
| 2015/0339967 A1 * | 11/2015 | Shin | G09G 3/2003 | 345/690 |

(Continued)

FOREIGN PATENT DOCUMENTS

| | | |
|---|---|---|
| JP | 2006-243560 A | 9/2006 |
| JP | 2021-12268 A | 2/2021 |

*Primary Examiner* — Afroza Chowdhury

(74) *Attorney, Agent, or Firm* — Rankin, Hill & Clark LLP

(57) ABSTRACT

A driver includes a first terminal group and a second terminal group, a control circuit for outputting a first pulse width signal group including a plurality of pulse width signals corresponding to a plurality of gray levels, and a second pulse width signal group which is different in correspondence between gray levels and pulse widths from the first pulse width signal group, a first drive circuit for outputting a first segment drive signal group based on pulse width signals selected from the first pulse width signal group in accordance with gradation data, to a first terminal group, and a second drive circuit for outputting a second segment drive signal group based on pulse width signals selected from the second pulse width signal group in accordance with the gradation data, to a second terminal group.

13 Claims, 20 Drawing Sheets

(56) References Cited

U.S. PATENT DOCUMENTS

| | | | | |
|---|---|---|---|---|
| 2017/0124962 | A1* | 5/2017 | Oh | G09G 3/3406 |
| 2021/0005157 | A1 | 1/2021 | Takizawa et al. | |
| 2022/0223103 | A1* | 7/2022 | Xi | G09G 3/32 |

* cited by examiner

| GRADATION DATA | | | | GRAY LEVEL |
|---|---|---|---|---|
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 0 | 14 |
| 1 | 1 | 1 | 1 | 15 |

FIG. 10

| D7 | D6 | D5 | D4 | D3 | D2 | D1 | D0 | DESCRIPTION | |
|---|---|---|---|---|---|---|---|---|---|
| P17 | P16 | P15 | P14 | P13 | P12 | P11 | P10 | PARAMETER 1 | GRADATION DENSITY SETTING AT GRAY LEVEL 1 (GS1[1]) |
| P27 | P26 | P25 | P24 | P23 | P22 | P21 | P20 | PARAMETER 2 | GRADATION DENSITY SETTING AT GRAY LEVEL 2 (GS1[2]) |
| P37 | P36 | P35 | P34 | P33 | P32 | P31 | P30 | PARAMETER 3 | GRADATION DENSITY SETTING AT GRAY LEVEL 3 (GS1[3]) |
| P47 | P46 | P45 | P44 | P43 | P42 | P41 | P40 | PARAMETER 4 | GRADATION DENSITY SETTING AT GRAY LEVEL 4 (GS1[4]) |
| P57 | P56 | P55 | P54 | P53 | P52 | P51 | P50 | PARAMETER 5 | GRADATION DENSITY SETTING AT GRAY LEVEL 5 (GS1[5]) |
| P67 | P66 | P65 | P64 | P63 | P62 | P61 | P60 | PARAMETER 6 | GRADATION DENSITY SETTING AT GRAY LEVEL 6 (GS1[6]) |
| P77 | P76 | P75 | P74 | P73 | P72 | P71 | P70 | PARAMETER 7 | GRADATION DENSITY SETTING AT GRAY LEVEL 7 (GS1[7]) |
| P87 | P86 | P85 | P84 | P83 | P82 | P81 | P80 | PARAMETER 8 | GRADATION DENSITY SETTING AT GRAY LEVEL 8 (GS1[8]) |
| P97 | P96 | P95 | P94 | P93 | P92 | P91 | P90 | PARAMETER 9 | GRADATION DENSITY SETTING AT GRAY LEVEL 9 (GS1[9]) |
| P107 | P106 | P105 | P104 | P103 | P102 | P101 | P100 | PARAMETER 10 | GRADATION DENSITY SETTING AT GRAY LEVEL 10 (GS1[10]) |
| P117 | P116 | P115 | P114 | P113 | P112 | P111 | P110 | PARAMETER 11 | GRADATION DENSITY SETTING AT GRAY LEVEL 11 (GS1[11]) |
| P127 | P126 | P125 | P124 | P123 | P122 | P121 | P120 | PARAMETER 12 | GRADATION DENSITY SETTING AT GRAY LEVEL 12 (GS1[12]) |
| P137 | P136 | P135 | P134 | P133 | P132 | P131 | P130 | PARAMETER 13 | GRADATION DENSITY SETTING AT GRAY LEVEL 13 (GS1[13]) |
| P147 | P146 | P145 | P144 | P143 | P142 | P141 | P140 | PARAMETER 14 | GRADATION DENSITY SETTING AT GRAY LEVEL 14 (GS1[14]) |
| P157 | P156 | P155 | P154 | P153 | P152 | P151 | P150 | PARAMETER 15 | GRADATION DENSITY SETTING AT GRAY LEVEL 15 (GS1[15]) |

FIG. 11

| D7 | D6 | D5 | D4 | D3 | D2 | D1 | D0 | DESCRIPTION | |
|---|---|---|---|---|---|---|---|---|---|
| P17 | P16 | P15 | P14 | P13 | P12 | P11 | P10 | PARAMETER 1 | GRADATION DENSITY SETTING AT GRAY LEVEL 1(GS2[1]) |
| P27 | P26 | P25 | P24 | P23 | P22 | P21 | P20 | PARAMETER 2 | GRADATION DENSITY SETTING AT GRAY LEVEL 2 (GS2[2]) |
| P37 | P36 | P35 | P34 | P33 | P32 | P31 | P30 | PARAMETER 3 | GRADATION DENSITY SETTING AT GRAY LEVEL 3 (GS2[3]) |
| P47 | P46 | P45 | P44 | P43 | P42 | P41 | P40 | PARAMETER 4 | GRADATION DENSITY SETTING AT GRAY LEVEL 4 (GS2[4]) |
| P57 | P56 | P55 | P54 | P53 | P52 | P51 | P50 | PARAMETER 5 | GRADATION DENSITY SETTING AT GRAY LEVEL 5 (GS2[5]) |
| P67 | P66 | P65 | P64 | P63 | P62 | P61 | P60 | PARAMETER 6 | GRADATION DENSITY SETTING AT GRAY LEVEL 6 (GS2[6]) |
| P77 | P76 | P75 | P74 | P73 | P72 | P71 | P70 | PARAMETER 7 | GRADATION DENSITY SETTING AT GRAY LEVEL 7 (GS2[7]) |
| P87 | P86 | P85 | P84 | P83 | P82 | P81 | P80 | PARAMETER 8 | GRADATION DENSITY SETTING AT GRAY LEVEL 8 (GS2[8]) |
| P97 | P96 | P95 | P94 | P93 | P92 | P91 | P90 | PARAMETER 9 | GRADATION DENSITY SETTING AT GRAY LEVEL 9 (GS2[9]) |
| P107 | P106 | P105 | P104 | P103 | P102 | P101 | P100 | PARAMETER 10 | GRADATION DENSITY SETTING AT GRAY LEVEL 10(GS2[10]) |
| P117 | P116 | P115 | P114 | P113 | P112 | P111 | P110 | PARAMETER 11 | GRADATION DENSITY SETTING AT GRAY LEVEL 11(GS2[11]) |
| P127 | P126 | P125 | P124 | P123 | P122 | P121 | P120 | PARAMETER 12 | GRADATION DENSITY SETTING AT GRAY LEVEL 12(GS2[12]) |
| P137 | P136 | P135 | P134 | P133 | P132 | P131 | P130 | PARAMETER 13 | GRADATION DENSITY SETTING AT GRAY LEVEL 13(GS2[13]) |
| P147 | P146 | P145 | P144 | P143 | P142 | P141 | P140 | PARAMETER 14 | GRADATION DENSITY SETTING AT GRAY LEVEL 14(GS2[14]) |
| P157 | P156 | P155 | P154 | P153 | P152 | P151 | P150 | PARAMETER 15 | GRADATION DENSITY SETTING AT GRAY LEVEL 15(GS2[15]) |

FIG. 12

| P17 | P16 | P15 | P14 | P13 | P12 | P11 | P10 | DESCRIPTION |
|---|---|---|---|---|---|---|---|---|
| * | * | * | * | 0 | 0 | 0 | 0 | 1.1% |
| * | * | * | * | 0 | 0 | 0 | 1 | 2.2% |
| * | * | * | * | 0 | 0 | 1 | 0 | 3.3% |
| * | * | * | * | 0 | 0 | 1 | 1 | 4.4% |
| * | * | * | * | 0 | 1 | 0 | 0 | 5.6% |
| * | * | * | * | 0 | 1 | 0 | 1 | 6.7% |
| * | * | * | * | 0 | 1 | 1 | 0 | 8.9% |
| * | * | * | * | 0 | 1 | 1 | 1 | 10.0% |
| * | * | * | * | 1 | 0 | 0 | 0 | 11.1% |
| * | * | * | * | 1 | 0 | 0 | 1 | 12.2% |
| * | * | * | * | 1 | 0 | 1 | 0 | 13.3% |
| * | * | * | * | 1 | 0 | 1 | 1 | 14.4% |
| * | * | * | * | 1 | 1 | 0 | 0 | 15.6% |
| * | * | * | * | 1 | 1 | 0 | 1 | 16.7% |
| * | * | * | * | 1 | 1 | 1 | 0 | 17.8% |
| * | * | * | * | 1 | 1 | 1 | 1 | 18.9% |

DRIVER CONFIGURED TO DRIVE A LIQUID CRYSTAL PANEL WITH A STATIC DRIVE SYSTEM AND ELECTRO-OPTIC DEVICE INCLUDING DRIVER

The present application is based on, and claims priority from JP Application Serial Number 2022-106891, filed Jul. 1, 2022, the disclosure of which is hereby incorporated by reference herein in its entirety.

BACKGROUND

1. Technical Field

The present disclosure relates to a driver, an electro-optic device, and so on.

2. Related Art

In the past, there has been known a driver which drives a liquid crystal panel using a static drive system. As related art, there can be cited a technology disclosed in, for example, JP-A-2006-243560 (Document 1). In Document 1, the static drive is performed on segment electrodes of the liquid crystal panel using a pulse-width modulation system.

In a related-art driver for driving the liquid crystal panel using the static drive system, the setting of a gradation density is set the same between a first terminal for outputting a first segment drive signal based on gradation data, and a second terminal for outputting a second segment drive signal based on the gradation data. Therefore, there is a problem that it is difficult to perform an adjustment of the luminance in each area where the segment electrode is arranged in the liquid crystal panel.

SUMMARY

An aspect of the present disclosure relates to a driver configured to drive a liquid crystal panel with a static drive system, including a first terminal group to be coupled to a first segment electrode group of the liquid crystal panel, a second terminal group to be coupled to a second segment electrode group of the liquid crystal panel, a control circuit configured to output a first pulse width signal group including a plurality of pulse width signals corresponding to a plurality of gray levels, and a second pulse width signal group which includes a plurality of pulse width signals corresponding to the plurality of gray levels, and which is different in correspondence between gray levels and pulse widths from the first pulse width signal group, a first drive circuit configured to output a first segment drive signal group based on pulse width signals selected from the first pulse width signal group in accordance with gradation data for setting the plurality of gray levels, to the first terminal group, and a second drive circuit configured to output a second segment drive signal group based on pulse width signals selected from the second pulse width signal group in accordance with the gradation data, to the second terminal group.

Another aspect of the present disclosure relates to an electro-optic device including the driver described above, the liquid crystal panel, and a backlight for the liquid crystal panel.

BRIEF DESCRIPTION OF THE DRAWINGS

FIG. 10 is an explanatory diagram of gradation density setting to the first pulse width signal group.

FIG. 11 is an explanatory diagram of the gradation density setting to the second pulse width signal group.

FIG. 12 is a diagram showing a specific example of the gradation density setting to the gray level.

DESCRIPTION OF AN EXEMPLARY EMBODIMENT

A preferred embodiment of the present disclosure will hereinafter be described in detail. It should be noted that the present embodiment described hereinafter does not unreasonably limit the content as set forth in the appended claims, and all of the constituents described in the present embodiment are not necessarily essential constituent requirements.

1. Configuration Example of Driver

Figure 1:
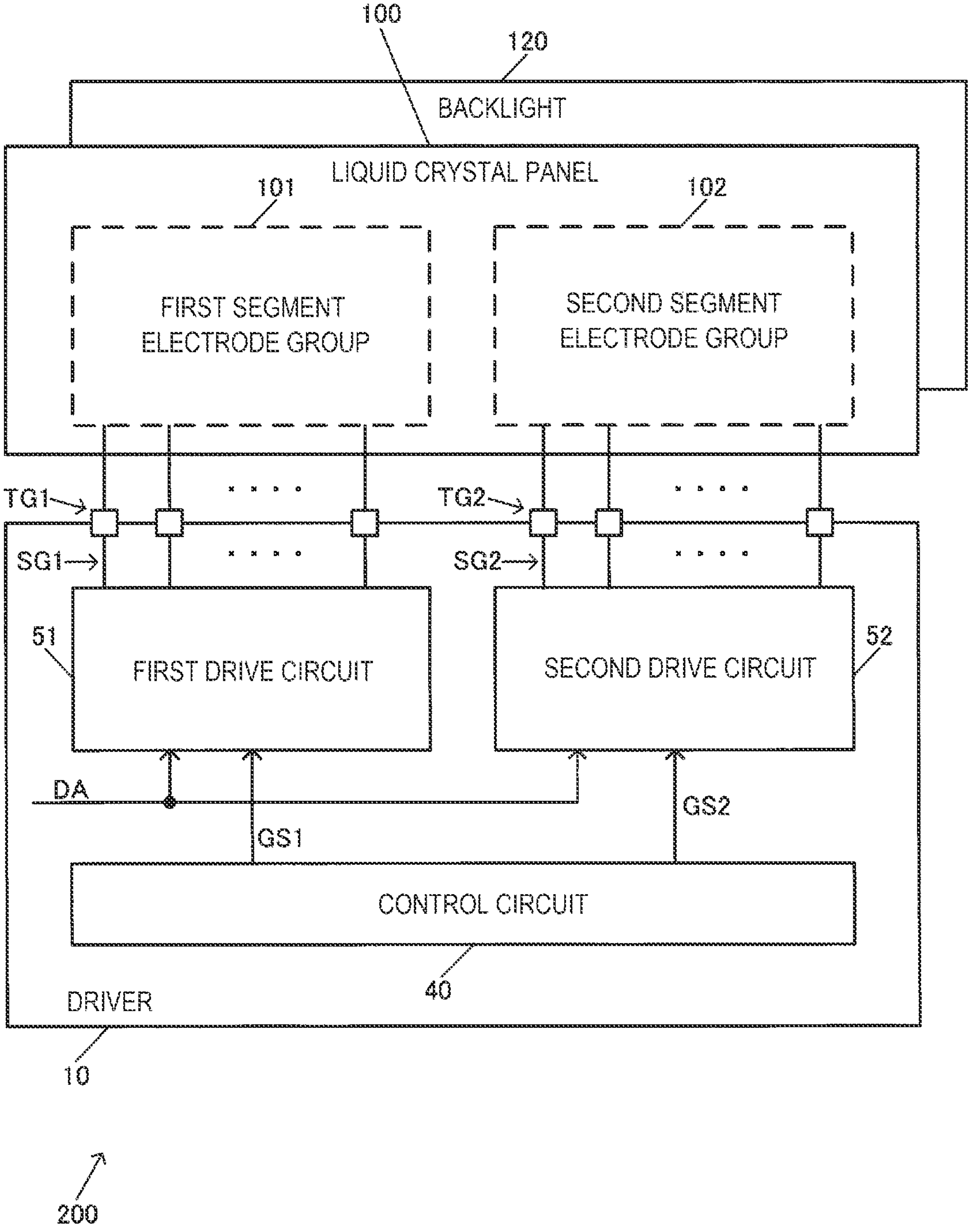
FIG. 1 is a diagram showing a configuration example of a driver according to the embodiment.

FIG. 1 shows a configuration example of a driver 10 according to the present embodiment. The driver 10 drives a liquid crystal panel 100 using a static drive system. Further, an electro-optic device 200 according to the present embodiment includes the driver 10 and the liquid crystal panel 100. Further, it is possible for the electro-optic device 200 to further include a backlight 120.

The liquid crystal panel 100 is an electro-optic panel. The liquid crystal panel 100 is a panel which is driven using the static drive system. Specifically, the liquid crystal panel 100 includes a first glass substrate, a second glass substrate, and liquid crystal. The liquid crystal is sealed between the first glass substrate and the second glass substrate. The first glass substrate is provided with segment electrodes, and the second glass substrate is provided with common electrodes. The driver 10 outputs segment drive signals to the segment electrodes. Further, it is possible for the driver 10 to output common drive signals to the common electrodes. Thus, a drive signal corresponding to a potential difference between the segment drive electrode and the common drive signal is applied to the liquid crystal between the segment electrode and the common electrode. The segment electrodes and the common electrodes are each a transparent electrode, and are each made of, for example, ITO (Indium Tin Oxide).

The backlight 120 is provided with a plurality of light emitting elements such as LEDs, and is arranged at, for example, a back side of the liquid crystal panel 100. In this case, it is possible to dispose a diffuser plate between the liquid crystal panel 100 and the backlight 120. As the backlight 120, it is possible to adopt a variety of types of backlights such as an edge light type, or a direct type. In the edge light type, a plurality of light emitting elements is arranged at at least one of, for example, an upper side, a lower side, a left side, and a right side of the liquid crystal panel 100, and the light from the plurality of light emitting elements is guided using a light guide plate disposed at the back side of the liquid crystal panel 100. In the direct type, the back light 120 having a plurality of light emitting elements arranged in, for example, a reticular pattern, or a matrix is arranged at the back side of the liquid crystal panel 100.

The driver 10 is, for example, a circuit device called an IC (Integrated Circuit). The driver 10 is, for example, an IC manufactured using a semiconductor process, and is a semiconductor chip having circuit elements formed on a semiconductor substrate. The driver 10 as the circuit device is mounted on a glass substrate of, for example, the liquid crystal panel 100. For example, the driver 10 is mounted on the first glass substrate provided with the segment electrodes. Alternatively, it is possible for the driver 10 to be mounted on a circuit board, and the circuit board and the liquid crystal panel 100 can be coupled to each other with a flexible board.

The driver 10 which drives the liquid crystal panel 100 using the static drive system includes a first terminal group TG1, a second terminal group TG2, a control circuit 40, a first drive circuit 51, and a second drive circuit 52. It should be noted that in the present embodiment, there is presented a description mainly citing when two drive circuits, namely the first drive circuit 51 and the second drive circuit 52, are disposed, and two terminal groups, namely the first terminal group TG1 and the second terminal group TG2, are disposed as an example, but the present embodiment is not limited thereto, and it is possible to dispose three or more drive circuits and three or more terminal groups to the driver 10.

The first terminal group TG1 is coupled to a first segment electrode group 101 of the liquid crystal panel 100. The second terminal group TG2 is coupled to a second segment electrode group 102 of the liquid crystal panel 100. The first terminal group TG1, the second terminal group TG2 are coupled to the first segment electrode group 101, the second segment electrode group 102 via, for example, segment wiring on the glass substrate. Each of the terminal groups TG1, TG2 includes a plurality of terminals. The terminals are, for example, pads of the driver 10 as a circuit device. For example, in a pad area, there is exposed a metal layer from a passivation film which is an insulating layer, and the pads as the terminals of the driver 10 are formed of the metal layer thus exposed. It should be noted that the coupling in the present embodiment is electrical coupling. The electrical coupling means coupling capable of transmitting an electrical signal, and is coupling with which transmission of information by the electrical signal is achievable. The electrical coupling can also be coupling via a passive element or the like.

Figure 2:
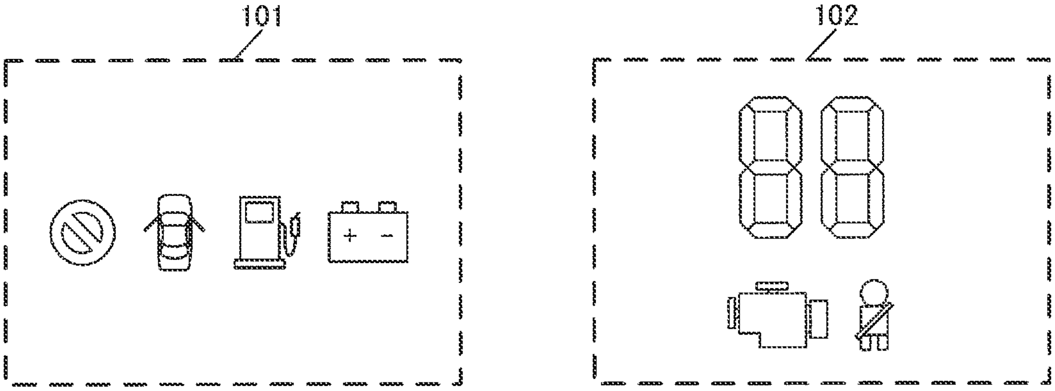
FIG. 2 is an arrangement example of a segment electrode in a liquid crystal panel.

FIG. 2 shows an example of the first segment electrode group 101 and the second segment electrode group 102. As shown in FIG. 2, as each of the first segment electrode group 101 and the second segment electrode group 102, there is provided a plurality of segment electrodes to the liquid crystal panel 100. The segment electrodes are an electrode for displaying an icon such as warning in a cluster panel of a vehicle, segment electrodes in eight-segment display, and so on.

The driver 10 according to the present embodiment is a circuit device for driving the liquid crystal panel 100 for displaying warning lamps, a speed meter, or a simplified navigation system which is confirmed for driving by a driver of, for example, a vehicle or a bike. It should be noted that display contents of the liquid crystal panel 100 are not limited to the warning lamps, the speed meter, and the simplified navigation system described above. Further, the driver 10 according to the present embodiment is not limited to a driver for the liquid crystal panel 100 for displaying images, and can also be used as a driver for the liquid crystal panel 100 for a purpose of, for example, a shutter function of light from the light emitting elements of the backlight 120. For example, the driver 10 according to the present embodiment can be a driver for the liquid crystal panel 100 used for an automatic high-beam system of headlights of a vehicle.

The control circuit 40 outputs a first pulse width signal group GS1 including a plurality of pulse width signals corresponding to a plurality of gray levels. Further, the control circuit 40 outputs a second pulse width signal group GS2 which includes a plurality of pulse width signals corresponding to a plurality of gray levels, and which is different in correspondence between the gray levels and the pulse widths from the first pulse width signal group GS1. The pulse width signals included in the pulse width signal groups GS1, GS2 are signals used for PWM (Pulse Width Modulation) drive as the pulse width modulation. Further, the gray levels are set by gradation data DA. Further, the gray levels and the pulse width signals in the pulse width signal groups GS1, GS2 are made to correspond to each other with gradation density setting data. The control circuit 40 is, for example, a logic circuit. The control circuit 40 can be realized by a circuit of an ASIC (Application Specific Integrated Circuit) with automatic arrangement wiring such as a gate array.

The first drive circuit 51 and the second drive circuit 52 are each a segment drive circuit, and are each a circuit for driving the segment electrodes of the liquid crystal panel 100 using the PWM. Further, the first drive circuit 51 outputs the first segment drive signal group SG1 based on the pulse width signals selected from the first pulse width signal group in accordance with the gradation data DA for setting the plurality of gray levels, to the first terminal group TG1. For example, the first drive circuit 51 selects the pulse width signal from the first pulse width signal group GS1 based on the gradation data DA. Then, the first drive circuit 51 performs, for example, polarity reversion, level shift, and buffering on the pulse width signal thus selected to output the segment drive signals in the first segment drive signal group SG1 to the respective terminals in the first terminal group TG1. Further, the second drive circuit 52 outputs the second segment drive signal group SG2 based on the pulse width signals selected from the second pulse width signal group GS2 in accordance with the gradation data DA, to the second terminal group TG2. For example, the second drive circuit 52 selects the pulse width signal from the second pulse width signal group GS2 based on the gradation data DA. Then, the second drive circuit 52 performs, for example, polarity reversion, level shift, and buffering on the pulse width signal thus selected to output the segment drive signals in the second segment drive signal group SG2 to the respective terminals in the second terminal group TG2.

As described above, the driver 10 according to the present embodiment includes the first terminal group TG1 and the second terminal group TG2 respectively coupled to the first segment electrode group 101 and the second segment electrode group 102 of the liquid crystal panel 100, the first drive circuit 51 for driving the first segment electrode group 101, the second drive circuit 52 for driving the second segment electrode group 102, and the control circuit 40. Further, the control circuit 40 outputs the first pulse width signal group GS1 and the second pulse width signal group GS2 different in correspondence between the gray levels and the pulse widths from the first pulse width signal group as the pulse width signal groups for the PWM driving. Further, the first drive circuit 51 outputs the first segment drive signal group SG1 based on the pulse width signals selected from the first pulse width signal group GS1 from the control circuit 40 in accordance with the gradation data DA, to the first terminal group TG1 to drive the first segment electrode group 101. Further, the second drive circuit 52 outputs the second segment drive signal group SG2 based on the pulse width signals selected from the second pulse width signal group GS2 from the control circuit 40 in accordance with the gradation data DA, to the second terminal group TG2 to drive the second segment electrode group 102.

In this way, the first segment electrode group 101 of the liquid crystal panel 100 becomes to be driven by the first segment drive signal group SG1 generated based on the gradation data DA and the first pulse width signal group GS1. Further, the second segment electrode group 102 of the liquid crystal panel 100 becomes to be driven by the second segment drive signal group SG2 generated based on the gradation data DA and the second pulse width signal group GS2. Further, as described later in detail, the first pulse width signal group GS1 and the second pulse width signal group GS2 are made different in correspondence between the gray levels set by the gradation data DA and the pulse widths of the respective pulse width signals from each other. Therefore, it becomes possible to make the pulse width in the PWM drive different between the first segment electrode group 101 driven by the first drive circuit 51 and the second segment electrode group 102 driven by the second drive circuit 52 even when using the same gradation data DA. For example, it becomes possible to make the setting of the gradation density with respect to the gradation data DA different between an area of the first segment electrode group 101 and an area of the second segment electrode group 102. Therefore, it becomes possible to adjust the gradation density for each of the area of the first segment electrode group 101 and the area of the second segment electrode group 102.

2. Detailed Configuration Example

Figure 3:
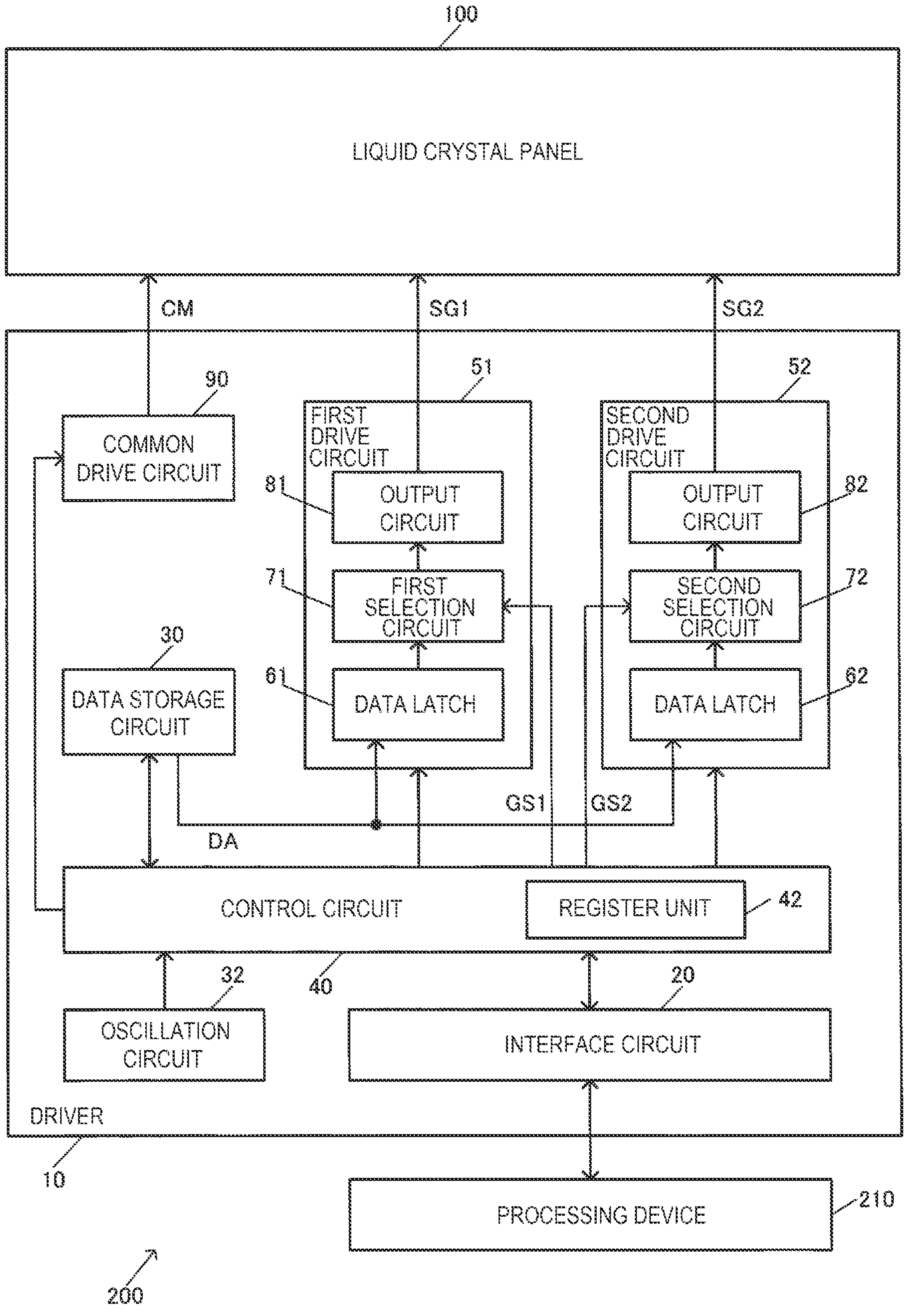
FIG. 3 is a diagram showing a detailed configuration example of the driver according to the embodiment.

FIG. 3 shows a detailed configuration example of the driver 10 according to the present embodiment. In FIG. 3, the driver 10 is provided with an interface circuit 20, a data storage circuit 30, an oscillation circuit 32, and a common drive circuit 90 in addition to the control circuit 40, the first drive circuit 51, and the second drive circuit 52 shown in FIG. 1.

The interface circuit 20 is a circuit which functions as an interface with a processing device 210 located outside, and performs communication processing between the processing device 210 and the driver 10. For example, the interface circuit 20 receives a command from the processing device 210, and a variety of types of data such as the gradation data and the gradation density setting data. The gradation data is data for setting the gray level, and is also called display data. The interface circuit 20 can be realized by a serial interface circuit of, for example, an $I^2C$ (Inter Integrated Circuit) system, an SPI (Serial Peripheral Interface) system, or the like.

The processing device 210 is, for example, a host device of the driver 10, and is realized by, for example, a processor or a display controller. The processor is a CPU, a microcomputer, or the like. It should be noted that the processing device 210 can be a circuit device constituted by a plurality of circuit components. For example, in an in-car electronic device, the processing device 210 can be an ECU (Electronic Control Unit).

The data storage circuit 30 is a circuit for storing the gradation data and so on, and can be realized by a memory such as a RAM. The data storage circuit 30 stores the gradation data for setting the gradation in each of the segment electrodes of the liquid crystal panel 100. The gradation data is received from, for example, the processing device 210 via the interface circuit 20, and is then stored in the data storage circuit 30.

The oscillation circuit 32 generates an oscillation signal, and then outputs a clock signal based on the oscillation signal. Each of the circuits of the driver 10 such as the control circuit 40 operates based on the clock signal.

The control circuit 40 has a register unit 42. The register unit 42 is realized by, for example, a flip-flop circuit. Further, the register unit 42 stores the gradation density setting data corresponding to each of the gray levels.

The common drive circuit 90 outputs a common drive signal CM to drive the common electrodes of the liquid crystal panel 100. For example, the driver 10 has a terminal from which the common drive signal CM is output, and the common drive signal CM is output to the common electrodes of the liquid crystal panel 100 via this terminal. The common drive signal CM is a signal the polarity of which is reversed, for example, frame by frame.

The first drive circuit 51 includes a data latch 61, a first selection circuit 71, and an output circuit 81. The second drive circuit 52 includes a data latch 62, a second selection circuit 72, and an output circuit 82. The data latches 61, 62 are a first data latch and a second data latch, respectively, and the output circuits 81, 82 are a first output circuit and a second output circuit, respectively.

The data latches 61, 62 latch the gradation data DA from the data storage circuit 30. For example, the data latches 61, 62 latch the gradation data DA based on a latch signal from the control circuit 40.

The first selection circuit 71 selects the pulse width signal corresponding to the gray level of the gradation data DA latched by the data latch 61 from the first pulse width signal group GS1. Further, the output circuit 81 performs buffering of the pulse width signal thus selected, and outputs the segment drive signal for the PWM drive to the corresponding segment electrode of the first segment electrode group 101. The second selection circuit 72 selects the pulse width signal corresponding to the gray level of the gradation data DA latched by the data latch 62 from the second pulse width signal group GS2. Further, the output circuit 82 performs buffering of the pulse width signal thus selected, and outputs the segment drive signal for the PWM drive to the corresponding segment electrode of the second segment electrode group 102.

Figure 4:
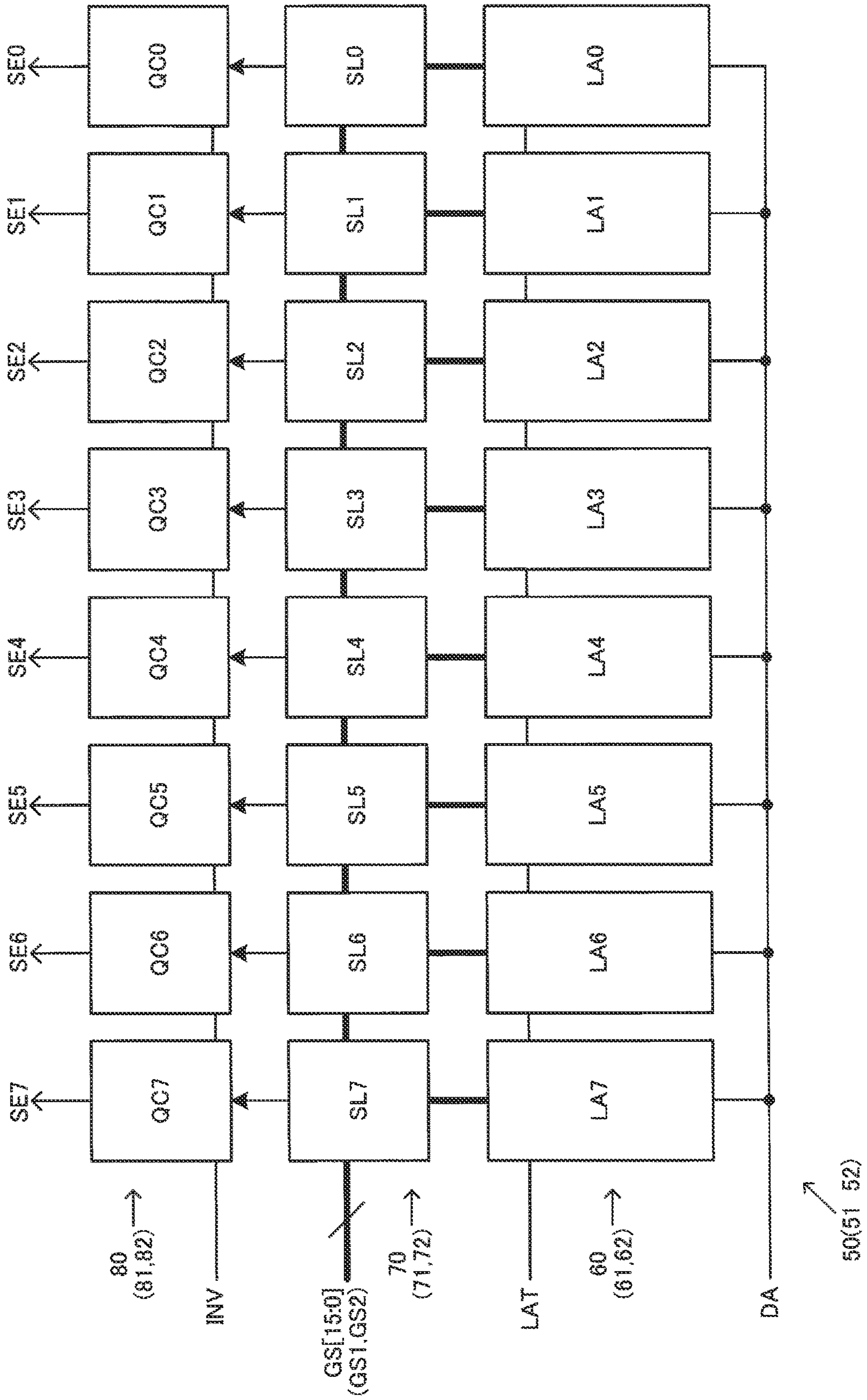
FIG. 4 is a diagram showing a configuration example of a drive circuit.

FIG. 4 shows a specific configuration example of the first drive circuit 51 and the second drive circuit 52. It should be noted that hereinafter the first drive circuit 51 and the second drive circuit 52 are arbitrarily referred to collectively as drive circuits 50. Further, the data latches 61, 62, the first selection circuit 71, the second selection circuit 72, the output circuits 81, 82 are arbitrarily referred to collectively as data latches 60, selection circuits 70, and output circuits 80, respectively. Further, the first pulse width signal group GS1 and the second pulse width signal group GS2 are arbitrarily referred to collectively as pulse width signal groups GS.

The data latches 60 are each a line latch circuit constituted by latch units LAO through LA7. Each of the latch units LAO through LA7 latches the gradation data DA from the data storage circuit 30 as a RAM or the like based on a latch signal LAT. Citing FIG. 6 described later as an example, the gradation data DA is 4-bit data, and thus, the expression with sixteen levels of the gray level becomes possible. For example, it is assumed that each of the first segment electrode group 101 and the second segment electrode group 102 has the segment electrodes SEL0 through SEL7. In this case, the latch units LAO through LA7 latch the gradation data DA for gradation display of the segment electrodes SEL0 through SEL7, respectively.

The selection circuits 70 each have selection units SL0 through SL7 to be coupled to the latch units LAO through LA7, and the output circuits 80 each have output units QC0 through QC7 to be coupled to the selection units SL0 through SL7. Further, each of the selection units SL0 through SL7 of the selection circuit 70 selects the pulse width signal corresponding to the gradation data DA out of the pulse width signal group GS[15:0] based on the gradation data DA latched by corresponding one of the latch units LAO through LA7. Further, the selection units SL0 through SL7 output the pulse width signals thus selected to the output units QC0 through QC7, respectively. Further, the output units QC0 through QC7 perform buffering and so on of the pulse width signals from the selection units SL0 through SL7 to output segment drive signals SE0 through SE7, respectively. These segment drive signals SE0 through SE7 correspond to each of the first segment drive signal group SG1 and the second segment drive signal group SG2.

Figures 5, 6:
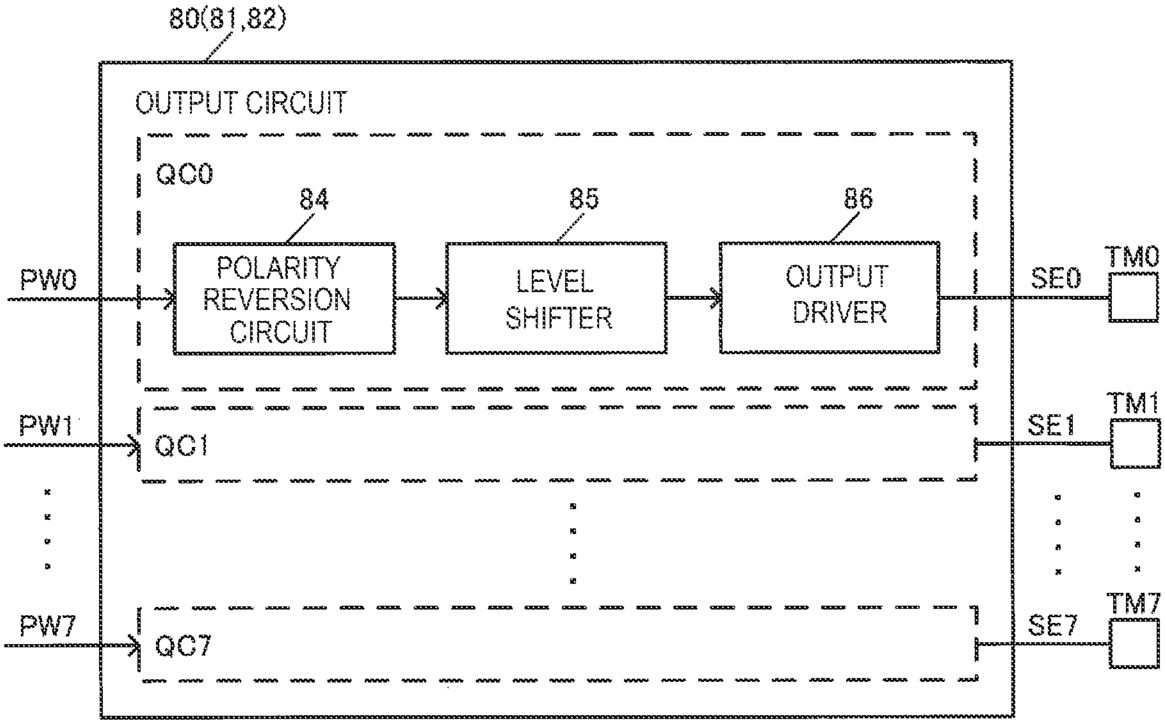
FIG. 5 is a diagram showing a configuration example of an output circuit.
FIG. 6 is an explanatory diagram of gradation data and a gray level.

FIG. 5 shows a configuration example of the output circuits 80. The output unit QC0 of the output circuits 80 includes a polarity reversion circuit 84, a level shifter 85, and an output driver 86. The polarity reversion circuit 84 of the output unit QC0 performs the polarity reversion on a pulse width signal PW0 explained with reference to FIG. 9 described later, wherein the pulse width signal PW0 selected by the selection unit SL0 from the pulse width signal group GS[15:0] in accordance with the gradation data is input to the polarity reversion circuit 84. The level shifter 85 performs level shift of a voltage of the pulse width signal PW0 on which the polarity reversion has been performed. The output driver 86 buffers the pulse width signal PW0 on which the level shift has been performed to output the result as the segment drive signal SE0 to the terminal TM0. The output units QC1 through QC7 each have the polarity reversion circuit 84, the level shifter 85, and the output driver 86 similarly to the output unit QC0, and perform substantially the same operation as that of the output unit QC0 on the pulse width signals PW1 through PW7 input to the output units QC1 through QC7 to output the segment drive signals SE1 through SE7 to the terminals TM1 through TM7, respectively. The terminals TM0 through TM7 shown in FIG. 5 correspond to each of the first terminal group TG1 and the second terminal group TG2.

FIG. 6 is an explanatory diagram showing a relationship between the gradation data and the gray level. In FIG. 6, since the gradation data is expressed in 4 bits, it is possible to express sixteen levels of the gray level with the gradation data. It should be noted that the number of bits of the gradation data is not limited to four, and can be no larger than three or no smaller than five, and the number of levels of the gray level is not limited to sixteen.

Figure 7:
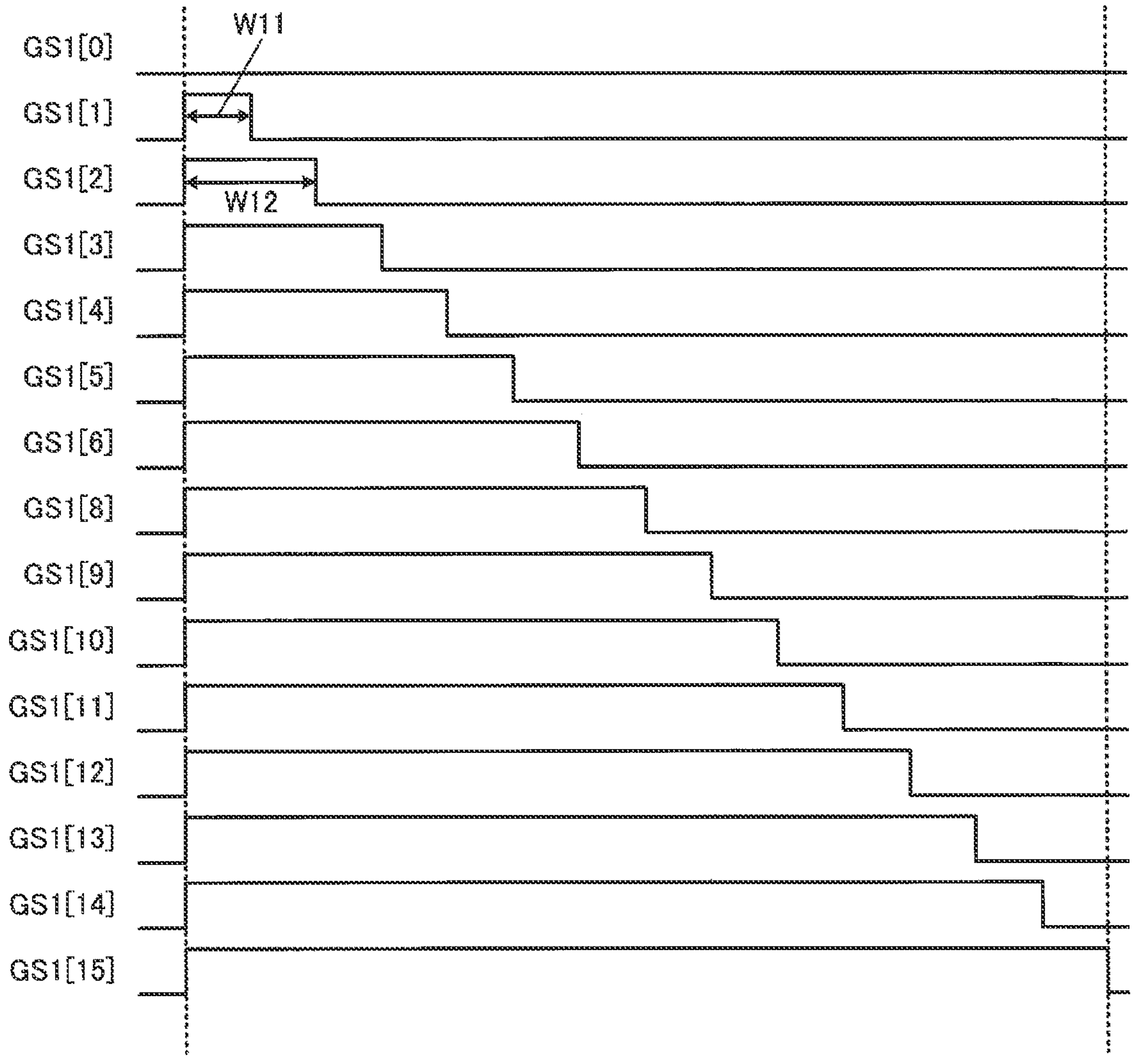
FIG. 7 is a diagram showing an example of signal waveforms of a first pulse width signal group.
Figure 8:
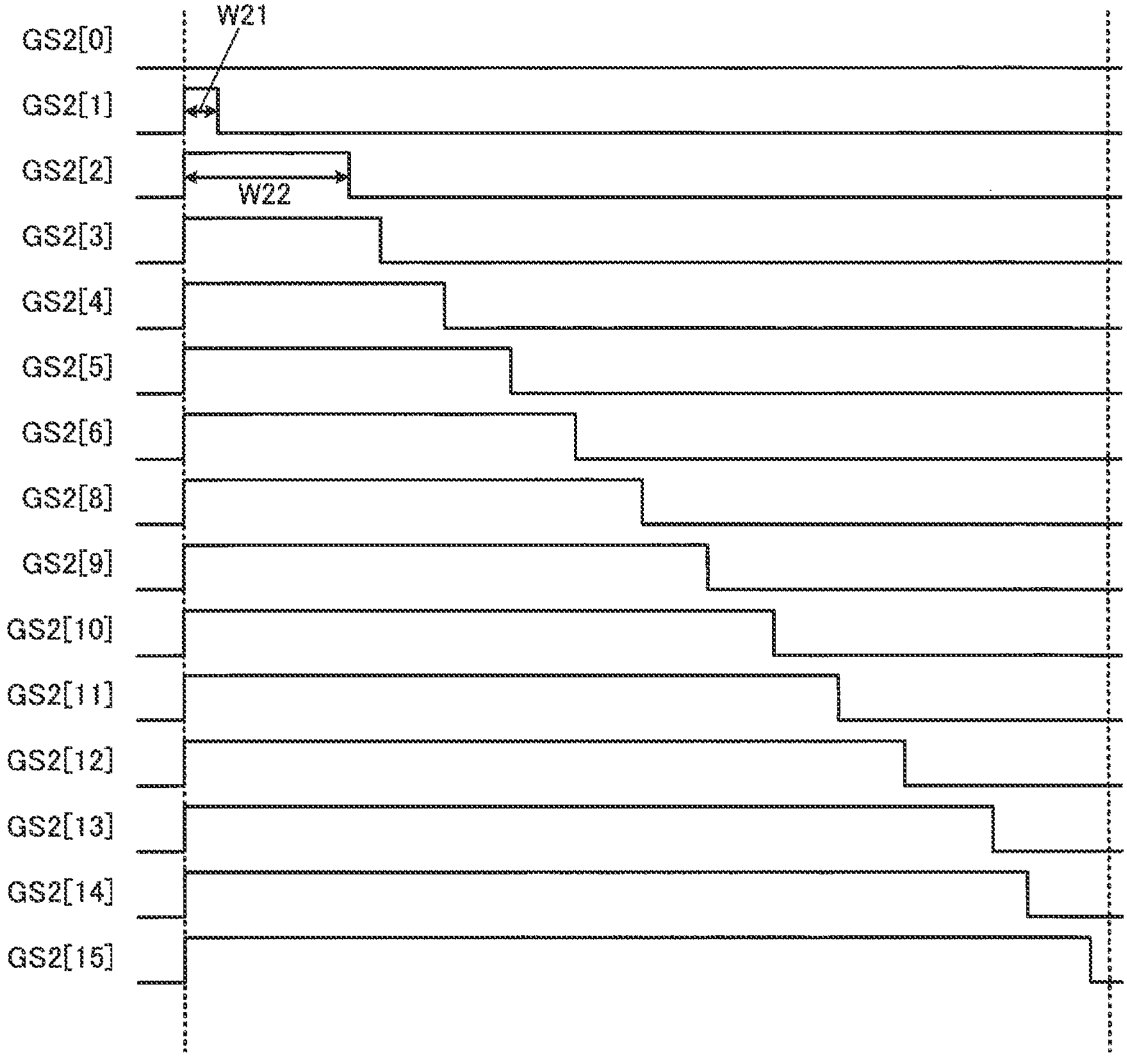
FIG. 8 is a diagram showing an example of signal waveforms of a second pulse width signal group.

FIG. 7 shows a waveform example of the first pulse width signal group GS1, and FIG. 8 shows a waveform example of the second pulse width signal group GS2. For example, in the first pulse width signal group GS1 shown in FIG. 7, when the gray level set by the gradation data shown in FIG. 6 is 1, the pulse width signal of GS1[1] in which the pulse width is set to W11 is selected. When the gray level is 2, there is selected the pulse width signal of GS1[2] in which the pulse width is set to W12. In the second pulse width signal group GS2 shown in FIG. 8, when the gray level set by the gradation data is 1, the pulse width signal of GS2[1] in which the pulse width is set to W21 is selected. When the gray level is 2, there is selected the pulse width signal of GS2[2] in which the pulse width is set to W22. Further, the drive of the segment electrode using the PWM becomes to be performed using the pulse width signal selected in accordance with the gray level corresponding to the gradation data in such a manner as described above.

As described above, in the present embodiment, to the gray level 1, there corresponds the pulse width W11 of GS1[1] in the first pulse width signal group GS1, and there corresponds the pulse width W21 of GS2[1] in the second pulse width signal group GS2, which the correspondence between the gray levels and the pulse widths is different therebetween. Similarly, to the gray level 2, there corresponds the pulse width W12 of GS1[2] in the first pulse width signal group GS1, and there corresponds the pulse width W22 of GS2[2] in the second pulse width signal group GS2, which the correspondence between the gray levels and the pulse widths is different therebetween.

It should be noted that the waveforms of the first pulse width signal group GS1 and the second pulse width signal group GS2 shown in FIG. 7 and FIG. 8 are illustrative only, and it is possible to generate the pulse width signal group having a variety of waveforms in accordance with setting of the gradation density and so on.

Figure 9:
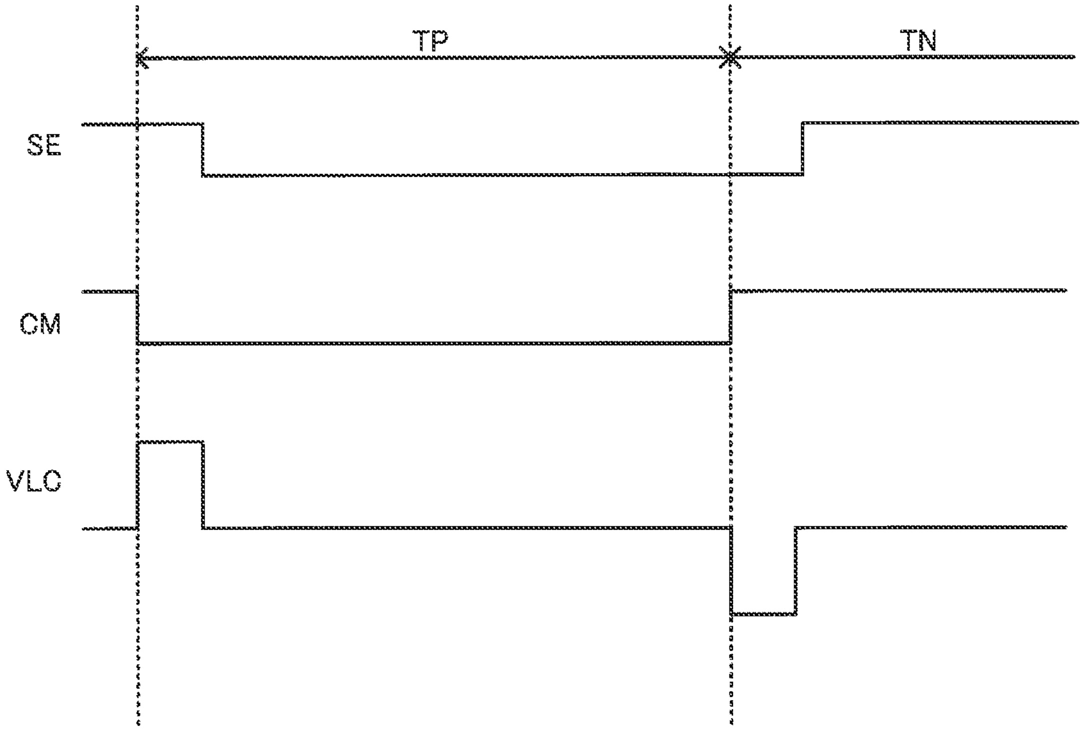
FIG. 9 is a diagram showing an example of waveforms of a segment drive signal, a common drive signal, and a drive signal of a liquid crystal element.

FIG. 9 shows an example of waveforms of the segment drive signal SE, the common drive signal CM, and a drive signal VLC of a liquid crystal element. In a positive polarity period TP, there is output the segment drive signal SE having a positive polarity, and in a negative polarity period TN, there is output the segment drive signal SE having a negative polarity. The polarity reversion of the segment drive signal SE is performed by the polarity reversion circuit 84 shown in FIG. 5. Further, in the positive polarity period TP, there is output the common drive signal CM having the negative polarity, and in the negative polarity period TN, there is output the common drive signal CM having the positive polarity. Thus, to the liquid crystal element in the segment electrode of the liquid crystal panel 100, there is applied a voltage of the segment drive signal SE on which the polarity reversion has been performed frame by frame as shown in FIG. 9, and thus, burn-in or the like is prevented.

FIG. 10 is an explanatory diagram of gradation density setting with respect to the first pulse width signal group GS1, and FIG. 11 is an explanatory diagram of gradation density setting with respect to the second pulse width signal group GS2. In FIG. 10, the gradation density corresponding to the gray level 1 of the first pulse width signal group GS1 is set in accordance with parameters P10 through P17. In other words, the pulse width W11 of the pulse width signal of GS1[1] shown in FIG. 7 is set. Further, the gradation density corresponding to the gray level 2 of the first pulse width signal group GS1 is set in accordance with parameters P20 through P27. In other words, the pulse width W12 of the pulse width signal of GS1[2] shown in FIG. 7 is set. Other gray levels 3 through 15 are also set in accordance with parameters P30 through P157. For example, by the processing device 210 shown in FIG. 3 setting the parameters P10 through P157 with a command for setting the gradation density of the first pulse width signal group GS1, it results in that the gradation density setting data corresponding to the first pulse width signal group GS1 is written into the register unit 42.

Further, in FIG. 11, the gradation density corresponding to the gray level 1 of the second pulse width signal group GS2 is set in accordance with the parameters P10 through P17. In other words, the pulse width W21 of the pulse width signal of GS2[1] shown in FIG. 8 is set. Further, the gradation density corresponding to the gray level 2 of the second pulse width signal group GS2 is set in accordance with the parameters P20 through P27. In other words, the pulse width W22 of the pulse width signal of GS2[2] shown in FIG. 8 is set. Other gray levels 3 through 15 are also set in accordance with the parameters P30 through P157. For example, by the processing device 210 shown in FIG. 3 setting the parameters P10 through P157 with the command for setting the gradation density of the second pulse width signal group GS2, it results in that the gradation density setting data corresponding to the second pulse width signal group GS2 is written into the register unit 42.

FIG. 12 shows a specific example of setting of the gradation density to the gray level. In FIG. 12, there is shown an example of setting of the gradation density to the gray level 1. The gradation density is information of, for example, designating how much pulse width is set to the pulse width signal with respect to each of the gradation levels, and is information of, for example, setting a duty ratio of the pulse width signal in the PWM drive. In FIG. 12, there is shown a setting example of the gradation density of the gray level 1 assuming the gradation density of the maximum gray level as 100%. Citing FIG. 7 as an example, when the pulse width of GS1[15] of the gray level 15 as the maximum gray level is defined as 100%, the percentage of the pulse width W11 of GS1[1] of the gray level 1 to the pulse width of GS1[15] is set with the gradation density shown in FIG. 12. For example, as shown in FIG. 12, when (P13, P12, P11, P10)=(0, 0, 0, 0) is set, the pulse width W11 of GS1[1] is set to 1.1% to the 100% pulse width of GS1[15]. When (P13, P12, P11, P10)=(0, 0, 0, 1) is set, the pulse width W11 of GS1[1] is set to 2.2%. In such a manner, in the setting of the gradation density shown in FIG. 12, it is possible to set the pulse width W11 of GS1[1] by, for example, 1.1% such as 1.1%, 2.2%, 3.3%, . . . , 18.9%. In this way, it becomes possible to set the gradation density as the setting of the pulse width with respect to the rest of the gray levels. Further, with respect to the second pulse width signal group GS2 shown in FIG. 8, it is possible to set the gradation density as the setting of the pulse width to each of the gray levels separately from the first pulse width signal group GS1 shown in FIG. 7. It should be noted that the pulse width signal by such a small amount as shown in FIG. 12 can be generated by the control circuit 40 performing count processing with a counter operating based on a high-frequency clock signal.

As described above, in the present embodiment, as shown in FIG. 7, the control circuit 40 outputs the first pulse width signal group GS1 including the plurality of pulse width signals corresponding to the plurality of gray levels. Further, as shown in FIG. 8, the control circuit 40 outputs the second pulse width signal group GS2 which includes the plurality of pulse width signals corresponding to the plurality of gray levels, and which is different in correspondence between the gray levels and the pulse widths from the first pulse width signal group GS1.

Further, as described with reference to FIG. 4, FIG. 7, FIG. 10, FIG. 12, and so on, the first drive circuit 51 outputs the first segment drive signal group SG1 based on the pulse width signals selected from the first pulse width signal group GS1 in accordance with the gradation data for setting the plurality of gray levels, to the first terminal group TG1. Further, as described with reference to FIG. 4, FIG. 8, FIG. 11, FIG. 12, and so on, the second drive circuit 52 outputs the second segment drive signal group SG2 based on the pulse width signals selected from the second pulse width signal group GS2 in accordance with the gradation data, to the second terminal group TG2.

In this way, it becomes possible to make the pulse width in the PWM drive different between the first segment electrode group 101 driven by the first drive circuit 51 and the second segment electrode group 102 driven by the second drive circuit 52 even when using the same gradation data. Thus, it becomes possible to make the setting of the gradation density with respect to the gradation data different between an area of the first segment electrode group 101 and an area of the second segment electrode group 102.

For example, the driver 10 according to the present embodiment is a driver IC for the liquid crystal panel 100 as an electro-optic panel, and is a circuit for making the liquid crystal panel 100 of a segment display type with passive liquid crystal perform gradation display using the PWM drive. Further, in the gradation setting of the driver output in the driver 10, it is arranged that it is possible to perform the setting of the gradation density by the command setting so as to be separated into two or more areas by a lump block of the drive circuit for the segment electrodes with respect to the same gray level set by the gradation data stored in the data storage circuit 30 such as a RAM.

For example, in the past, in the output terminals of the driver 10 for outputting the same gray level set in accordance with the same gradation data value, the same gradation density has been set to all of the output terminals. Therefore, there has been a problem that it is difficult to adjust the luminance when the luminance is different between the arrangement areas of the segment electrodes on the liquid crystal panel 100 in some cases even at the same gray level, and with the same gradation density due to light unevenness of the backlight 120. Further, when being used for local dimming, there had also been a problem that it is difficult to adjust the luminance when it is necessary to finely adjust the luminance at a plurality of locations on the panel in the contrast adjustment of the display image of the TFT panel or the like arranged at the front side or the back side.

In this regard, in the present embodiment, even at the gray level set in accordance with the same gradation data value, it is possible to adjust the setting of the gradation density by the segment group on the liquid crystal panel 100. For example, while the same gradation density has been set in accordance with the same gray level in the past, it is possible to adjust the setting of the gradation density by the segment electrode group in the present embodiment. For example, even when it is desired to adjust the gradation density by the segment electrode group, but it is not desired to change the gray level set in accordance with the gradation data, it becomes possible to perform the setting of the gradation density separately on the segment electrode groups to which the gradation density is desired to be set independently of each other.

As described above, in the present embodiment, it is possible to adjust the gradation density in each of the plurality of areas on the liquid crystal panel 100 of the segment type by an IC of the single driver 10 without changing the gray levels set in accordance with the gradation data. For example, even when setting the same gray level, it is possible to partially adjust the gradation density by the display area. Further, it is unnecessary to change the gradation data for uniforming the gradation density irrespective of the individual difference of the liquid crystal panel 100 and an ambient environment such as outside light, it is possible to unify the display data which the display image is based on without changing the display data, and thus, it is possible to transmit the display data to the IC of the driver 10. It becomes unnecessary to adjust and process the original display image data by the processing device 210 at the host side. Further, when the luminance is different by the arrangement location on the liquid crystal panel 100 in some cases even at the same gray level, and with the same gradation density due to the light unevenness of the backlight 120 or the ambient environment such as the outside light, it becomes possible to adjust the luminance by setting the gradation density in each of the plurality of areas. Further, when being used for local dimming, it becomes possible to adjust the luminance by setting the gradation density in each of the plurality of areas when it is necessary to finely adjust the luminance at a plurality of locations on the panel in the contrast adjustment of the display image of the TFT panel or the like arranged at the front side or the back side.

Further, as shown in FIG. 3, the driver 10 according to the present embodiment includes the register unit 42. It should be noted that although the register unit 42 is provided to the control circuit 40 in FIG. 3, it is possible for the register unit 42 to be provided to a circuit block other than the control circuit 40. Further, the register unit 42 stores first gradation density setting data for setting the correspondence between the gray levels and the pulse widths in the first pulse width signal group GS1 shown in FIG. 7. The first gradation density setting data is such data as described with reference to, for example, FIG. 10 and FIG. 12. Further, the register unit 42 stores second gradation density setting data for setting the correspondence between the gray levels and the pulse widths in the second pulse width signal group GS2 shown in FIG. 8. The second gradation density setting data is such data as described with reference to, for example, FIG. 11 and FIG. 12.

Further, the control circuit 40 outputs such a first pulse width signal group GS1 as shown in, for example, FIG. 7 based on the first gradation density setting data stored in the register unit 42. Further, the control circuit 40 outputs such a second pulse width signal group GS2 as shown in FIG. 8 based on the second gradation density setting data stored in the register unit 42.

In this way, it becomes possible for the control circuit 40 to output the first pulse width signal group GS1 and the second pulse width signal group GS2 different in correspondence between the gray levels and the pulse widths from each other respectively to the first drive circuit 51 and the second drive circuit 52 using the first gradation density setting data and the second gradation density setting data stored in the register unit 42. Further, it becomes possible for the first drive circuit 51 to output the first segment drive signal group SG1 to the first segment electrode group 101 based on the gradation data and the first pulse width signal group GS1, and it becomes possible for the second drive circuit 52 to output the second segment drive signal group SG2 to the second segment electrode group 102 based on the gradation data and the second pulse width signal group GS2. Thus, it becomes possible to make the setting of the gradation density with respect to the gradation data different between the area of the first segment electrode group 101 and the area of the second segment electrode group 102.

Further, as shown in FIG. 3, the driver 10 includes the interface circuit 20, and the interface circuit 20 performs the processing of receiving the first gradation density setting data and the second gradation density setting data. For example, the processing device 210 located outside transmits the first gradation density setting data and the second gradation density setting data as described with reference to FIG. 10, FIG. 11, and FIG. 12, and then the interface circuit 20 receives the first gradation density setting data and the second gradation density setting data. For example, by the processing device 210 transmitting a command of gradation density setting for setting the parameters P10 through P157 shown in FIG. 10, FIG. 11, and FIG. 12, the interface circuit 20 receives the first gradation density setting data and the second gradation density setting data. Then, the first gradation density setting data and the second gradation density setting data thus received are stored into the register unit 42.

In this way, it becomes possible for the control circuit 40 to generate the first pulse width signal group GS1 and the second pulse width signal group GS2 based on the first gradation density setting data and the second gradation density setting data received via the interface circuit 20, and then output the first pulse width signal group GS1 and the second pulse width signal group GS2 to the first drive circuit 51 and the second drive circuit 52. Further, it becomes possible for the first drive circuit 51 and the second drive circuit 52 to output the first segment drive signal group SG1 and the second segment drive signal group SG2 to the first segment electrode group 101 and the second segment electrode group 102 based on the gradation data and the first pulse width signal group GS1, and the gradation data and the second pulse width signal group GS2, respectively.

Further, as shown in FIG. 3 and FIG. 4, the first drive circuit 51 includes the first selection circuit 71 to which the first pulse width signal group GS1 is input, and which selects the pulse width signal corresponding to the gradation data from the first pulse width signal group GS1. Further, the second drive circuit 52 includes the second selection circuit 72 to which the second pulse width signal group GS2 is input, and which selects the pulse width signal corresponding to the gradation data from the second pulse width signal group GS2. For example, the first selection circuit 71 selects the pulse width signal corresponding to the gradation data stored in the data latch 61 out of the first pulse width signal group GS1 from the control circuit 40, and then outputs the pulse width signal thus selected to the output circuit 81. Further, the second selection circuit 72 selects the pulse width signal corresponding to the gradation data stored in the data latch 62 out of the second pulse width signal group GS2 from the control circuit 40, and then outputs the pulse width signal thus selected to the output circuit 82.

In this way, by the first selection circuit 71 selecting the pulse width signal corresponding to the gradation data from the first pulse width signal group GS1, it becomes possible for the first drive circuit 51 to output the first segment drive signal group SG1 based on the pulse width signal selected from the first pulse width signal group GS1. Further, by the second selection circuit 72 selecting the pulse width signal corresponding to the gradation data from the second pulse width signal group GS2, it becomes possible for the second drive circuit 52 to output the second segment drive signal group SG2 based on the pulse width signal selected from the second pulse width signal group GS2. Thus, it becomes possible for the driver 10 to output the first segment drive signal group SG1 based on the pulse width signal selected in accordance with the gradation data from the first pulse width signal group GS1 to the first segment electrode group 101. Further, it becomes possible for the driver 10 to output the second segment drive signal group SG2 based on the pulse width signal selected in accordance with the gradation data from the second pulse width signal group GS2 to the second segment electrode group 102.

3. Layout Arrangement Example

Figure 13:
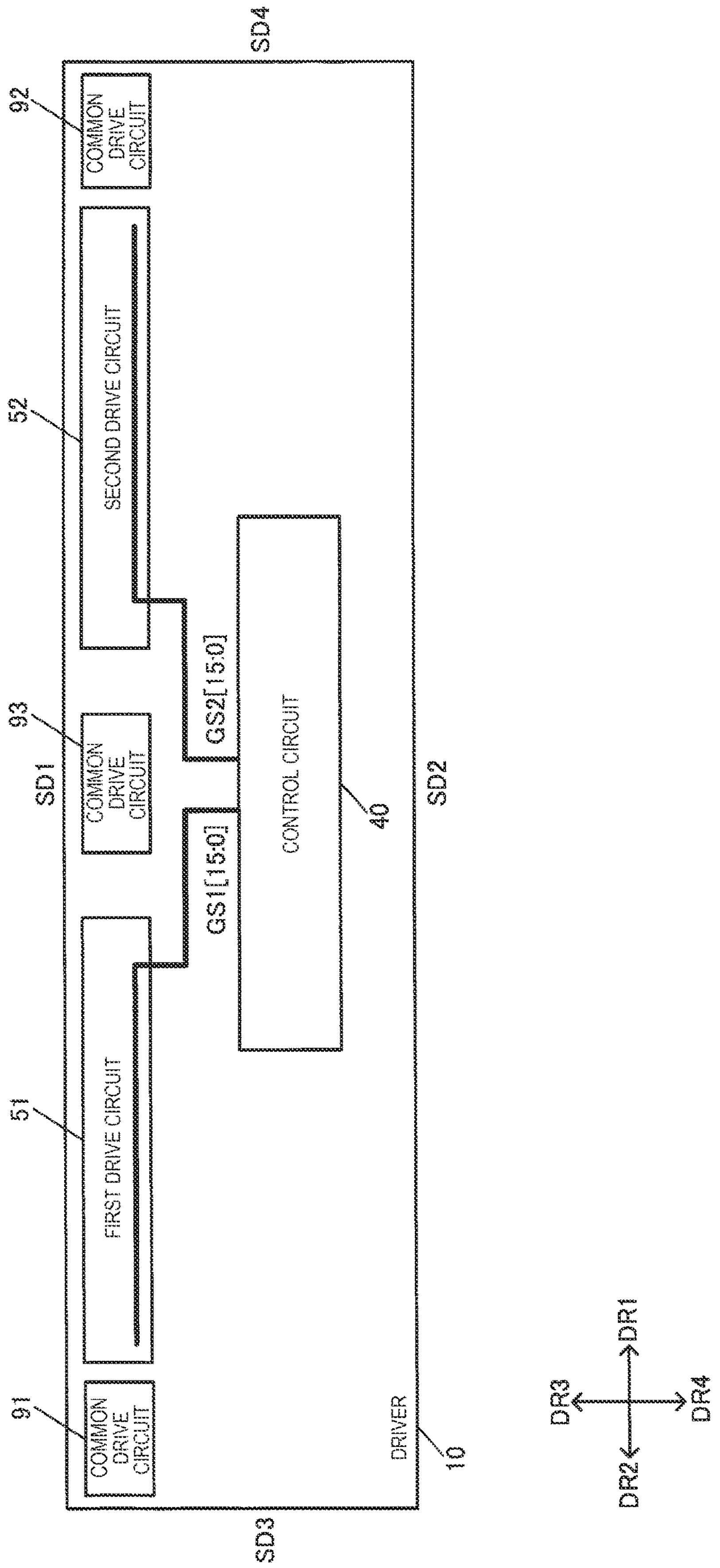
FIG. 13 is a diagram showing a first layout arrangement example of the driver.

Then, a variety of layout arrangement examples of the driver 10 will be described. FIG. 13 shows a first layout arrangement example of the driver 10. As shown in FIG. 13, the driver 10 has a first side SD1 as a long side, a second side SD2 as a long side opposed to the first side SD1, a third side SD3 as a short side, and a fourth side SD4 as a short side opposed to the third side SD3. The first side SD1, the second side SD2, the third side SD3, and the fourth side SD4 are four end sides of a semiconductor chip of the driver 10. Further, a long side direction of the driver 10 is defined as a first direction DR1, and an opposite direction to the first direction DR1 is defined as a second direction DR2. Further, a short side direction of the driver 10 is defined as a third direction DR3, and an opposite direction to the third direction DR3 is defined as a fourth direction DR4.

Further, in FIG. 13, when assuming the long side direction of the driver 10 as the first direction DR1, the first drive circuit 51 and the second drive circuit 52 are arranged along the first direction DR1. For example, the first drive circuit 51 and the second drive circuit 52 are arranged so that the longitudinal directions thereof are along the first direction DR1. Specifically, the first drive circuit 51 and the second drive circuit 52 are arranged along the first side SD1 as the long side of the driver 10. Further, the first terminal group TG1 shown in FIG. 1 is arranged between the first side SD1 of the driver 10 and the first drive circuit 51, and the second terminal group TG2 is arranged between the first side SD1 and the second drive circuit 52. In other words, the first terminal group TG1 and the second terminal group TG2 are respectively arranged between the first side SD1 and the first drive circuit 51, the second drive circuit 52 as the pads of the driver 10.

In this way, it becomes possible to couple the wiring lines of the first segment drive signal group SG1 from the first drive circuit 51 to the first segment electrode group 101 arranged in the first area of the liquid crystal panel 100 along short paths. Further, it becomes possible to couple the wiring lines of the second segment drive signal group SG2 from the second drive circuit 52 to the second segment electrode group 102 arranged in the second area of the liquid crystal panel 100 along short paths. Further, it becomes possible for the first drive circuit 51 to drive the first segment electrode group 101 in the first area with the first segment drive signal group SG1 based on the first pulse width signal group GS1, and it becomes possible for the second drive circuit 52 to drive the second segment electrode group 102 in the second area with the second segment drive signal group SG2 based on the second pulse width signal group GS2.

Further, as shown in FIG. 13, wiring lines of the first pulse width signal group GS1 from the control circuit 40 are coupled to the first drive circuit 51. Further, the wiring lines of the first pulse width signal group GS1 are laid along the first direction DR1 in an arrangement area of the first drive circuit 51. Further, wiring lines of the second pulse width signal group GS2 from the control circuit 40 are coupled to the second drive circuit 52. Further, the wiring lines of the second pulse width signal group GS2 are laid along the first direction DR1 in an arrangement area of the second drive circuit 52.

As described above, in FIG. 13, the first pulse width signal group GS1 and the second pulse width signal group GS2 are coupled to the first drive circuit 51 located at the left side from the control circuit 40 and the second drive circuit 52 located at the right side with the separate wiring lines. Further, it is arranged that it is possible to set the gradation density to the same gradation data independently in the first drive circuit 51 located at the left side and the second drive circuit 52 located at the right side.

Further, as shown in FIG. 13, the driver 10 includes a common drive circuit 91 for outputting a first common drive signal, and a common drive circuit 92 for outputting a second common drive signal. In FIG. 13, the common drive circuits 91, 92 are a first common drive circuit and a second common drive circuit, respectively. Further, the first common drive signal output by the common drive circuit 91 and the second common drive signal output by the common drive circuit 92 are, for example, signals the same in waveform, and are such signals as represented by the common drive signal CM shown in FIG. 9. The wiring line of the first common drive signal and the wiring line of the second common drive signal can be shorted to each other in, for example, the liquid crystal panel 100. Further, when defining the long side direction of the driver 10 as the first direction DR1, and the opposite direction to the first direction DR2 as the second direction DR2, the common drive circuit 91 is arranged at the second direction DR2 side of the first drive circuit 51, and the common drive circuit 92 is arranged at the first direction DR1 side of the second drive circuit 52. For example, the first drive circuit 51 and the second drive circuit 52 are arranged between the common drive circuit 91 and the common drive circuit 92. For example, the common drive circuit 91, the first drive circuit 51, the second drive circuit 52, and the common drive circuit 92 are arranged along the first side SD1 of the driver 10 in this order.

In this way, it becomes possible to supply the first common drive signal from the common drive circuit 91 to the common electrode opposed to the first segment electrode group 101 driven by the first drive circuit 51 with the wiring line along a short path. Further, it becomes possible to supply the second common drive signal from the common drive circuit 92 to the common electrode opposed to the second segment electrode group 102 driven by the second drive circuit 52 with the wiring line along a short path. Thus, it becomes possible to achieve efficient wiring lines and simplification of the wiring path in the liquid crystal panel 100, and it becomes possible to reduce a harmful influence due to a parasitic resistance or a parasitic capacitance of the wiring lines.

Further, in FIG. 13, there is included a common drive circuit 93 for outputting the common drive signal, and the common drive circuit 93 is arranged between the first drive circuit 51 and the second drive circuit 52. For example, the common drive circuit 93 is arranged at the first direction DR1 side of the first drive circuit 51, and the second drive circuit 52 is arranged at the first direction DR1 side of the common drive circuit 93. Specifically, the first drive circuit 51, the common drive circuit 93, and the second drive circuit 52 are arranged along the first side SD1 of the driver 10 in this order. The common drive circuit 93 is, for example, a third common drive circuit, and outputs a third common drive signal as the common drive signal. The third common drive signal is, for example, a signal the same in waveform as the first common drive signal and the second common drive signal. The wiring line of the third common drive signal and the wiring lines of the first common drive signal and the second common drive signal can be shorted to each other in, for example, the liquid crystal panel 100.

By arranging the common drive circuit 93 between the first drive circuit 51 and the second drive circuit 52 in such a manner, it becomes possible to supply the common drive signal from the common drive circuit 93 to the common electrode opposed to the first segment electrode group 101 driven by the first drive circuit 51 and the common electrode opposed to the second segment electrode group 102 driven by the second drive circuit 52 with the wiring lines along the short paths. Thus, it becomes possible to achieve the efficient wiring lines and the simplification of the wiring paths in the liquid crystal panel 100.

Further, the first drive circuit 51 and the second drive circuit 52 are arranged along the first side SD1 as the long side of the driver 10, and the control circuit 40 is arranged between the first drive circuit 51 and the second drive circuit 52, and the second side SD2 as the long side opposed to the first side SD1 of the driver 10. The control circuit 40 is arranged at, for example, the fourth direction DR4 side of the first drive circuit 51 or the second drive circuit 52, and at the third direction DR3 side of the second side SD2. For example, in FIG. 13, the control circuit 40 is arranged between the first drive circuit 51 and the second drive circuit 52, and the second side SD2. The control circuit 40 is arranged in the driver 10 so that, for example, the long side direction thereof is along the first direction DR1. It should be noted that it is possible to arrange other circuits or terminals as pads between the control circuit 40 and the second side SD2 of the driver 10.

By adopting such an arrangement, it becomes possible to lay wiring lines for the first pulse width signal group GS1 from the control circuit 40 to the first drive circuit 51 along short paths, and to lay wiring lines for the second pulse width signal group GS2 from the control circuit 40 to the second drive circuit 52 along short paths. Thus, it becomes possible to achieve efficient layout wiring and an efficient layout arrangement of the driver 10. For example, the first pulse width signal group GS1 and the second pulse width signal group GS2 are large in number of wiring lines. Therefore, unless the arrangement relationship between the control circuit 40, and the first drive circuit 51 and the second drive circuit 52 is appropriate, there is a possibility that the layout area of the driver 10 increases due to the wiring area of the first pulse width signal group GS1 and the second pulse width signal group GS2. In this regard, by arranging the first drive circuit 51 and the second drive circuit 52 along the first side SD1, and arranging the control circuit 40 between the first drive circuit 51 and the second drive circuit 52, and the second side SD2, it becomes possible to suppress an increase in layout area caused by the wiring area.

Figure 14:
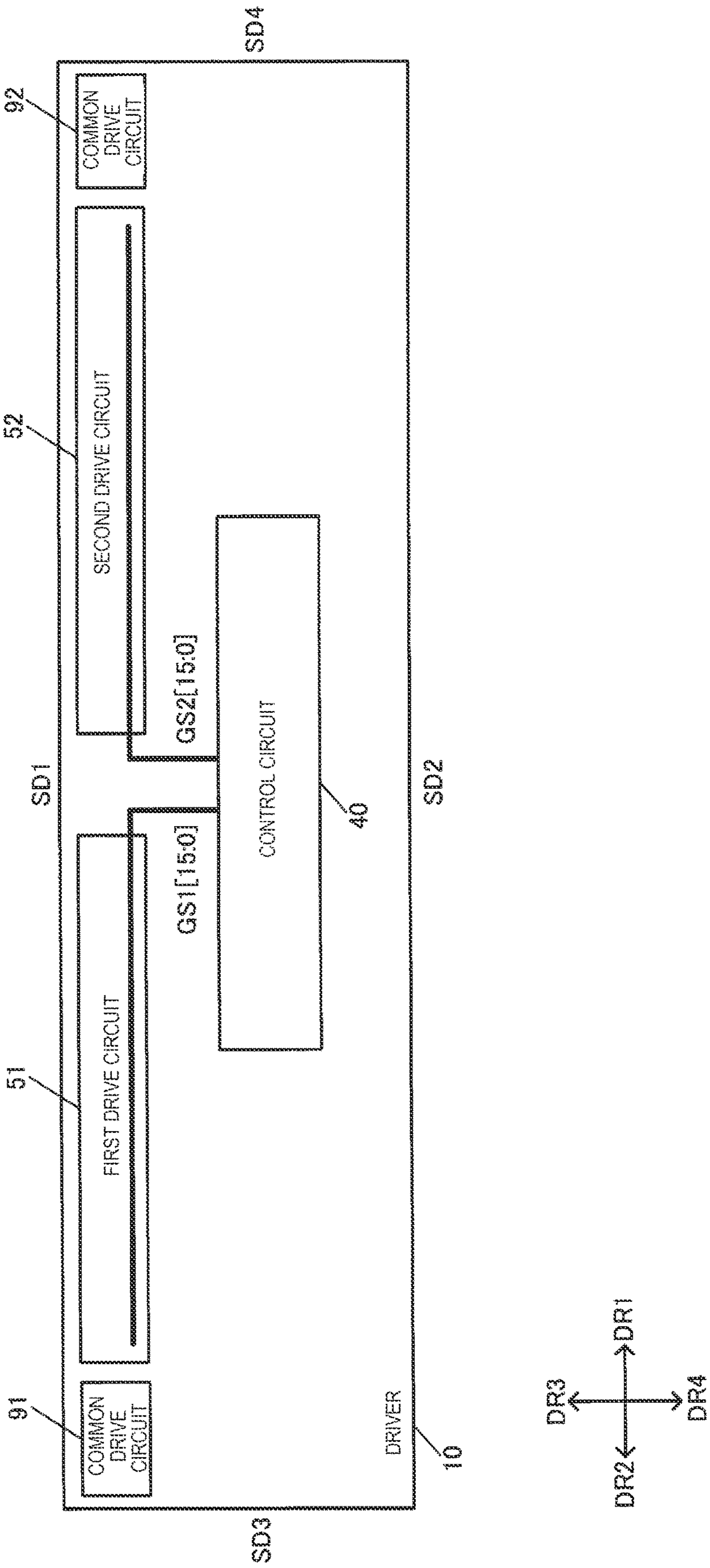
FIG. 14 is a diagram showing a second layout arrangement example of the driver.

FIG. 14 shows a second layout arrangement example of the driver 10. FIG. 14 is different from FIG. 13 in the point that the common drive circuit 93 is disposed between the first drive circuit 51 and the second drive circuit 52 in FIG. 13, while such a common drive circuit 93 is not disposed in FIG. 14. As described above, a variety of types of modified implementation can be made as the layout arrangement of the common drive circuit.

Figure 15:
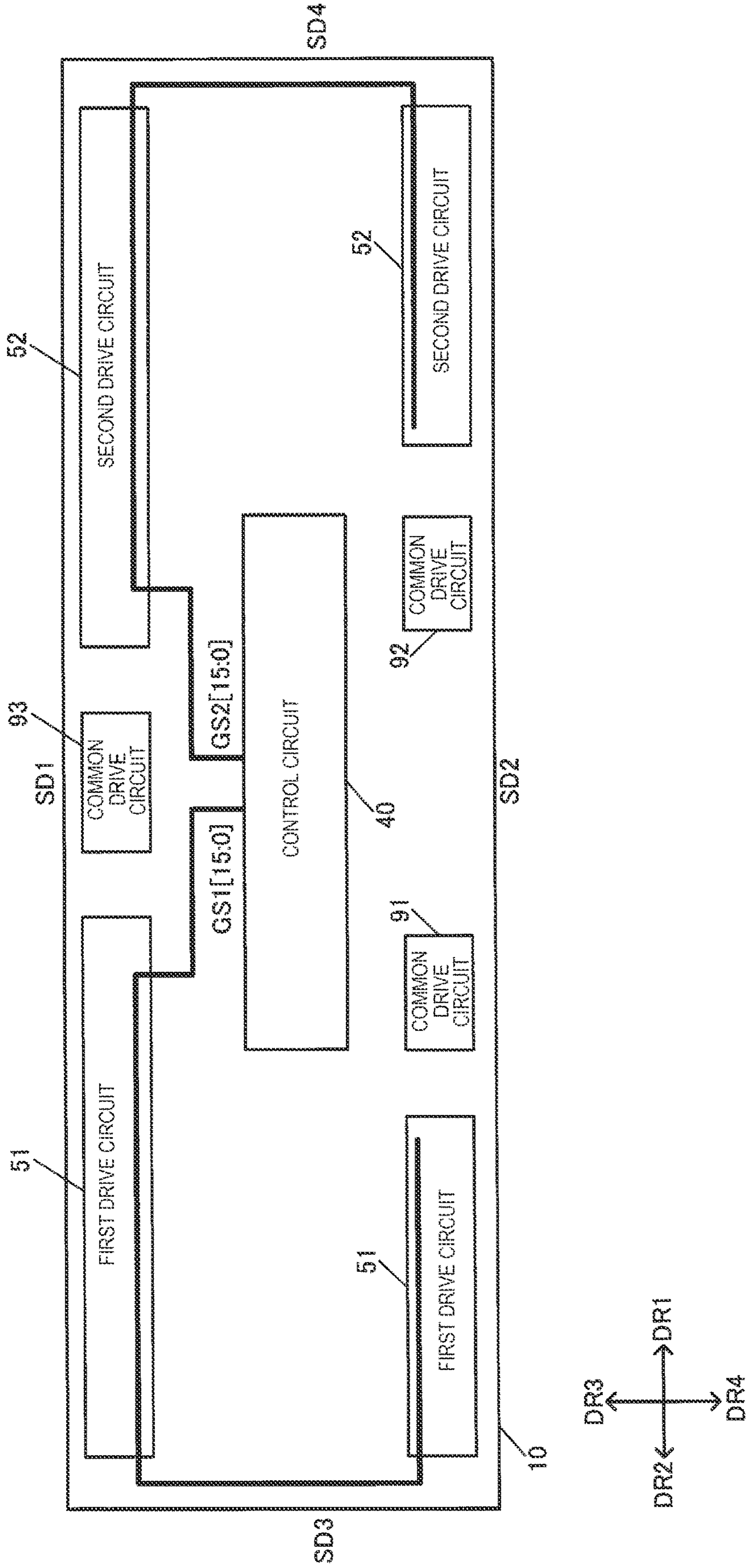
FIG. 15 is a diagram showing a third layout arrangement example of the driver.

FIG. 15 shows a third layout arrangement example of the driver 10. In the third layout arrangement example, the first drive circuit 51 is arranged along the first side SD1 of the driver 10, and at the same time, arranged along the second side SD2. For example, a first circuit portion of the first drive circuit 51 is arranged along the first side SD1, and a second circuit portion of the first drive circuit 51 is arranged along the second side SD2. Further, the second drive circuit 52 is arranged along the first side SD1 of the driver 10, and at the same time, arranged along the second side SD2. For example, a first circuit portion of the second drive circuit 52 is arranged along the first side SD1, and a second circuit portion of the second drive circuit 52 is arranged along the second side SD2. Further, the common drive circuit 93 is arranged between the first circuit portion of the first drive circuit 51 and the first circuit portion of the second drive circuit 52. In other words, the first circuit portion of the first drive circuit 51, the common drive circuit 93, the first circuit portion of the second drive circuit 52 are arranged along the first side SD1 in this order. Further, the common drive circuits 91, 92 are arranged between the second circuit portion of the first drive circuit 51 and the second circuit portion of the second drive circuit 52. In other words, the second circuit portion of the first drive circuit 51, the common drive circuit 91, the common drive circuit 92, the second circuit portion of the second drive circuit 52 are arranged along the second side SD2 in this order. Further, the first pulse width signal group GS1 from the control circuit 40 is transmitted through wiring lines to the first circuit portion and the second circuit portion of the first drive circuit 51, and the second pulse width signal group GS2 from the control circuit 40 is transmitted through wiring lines to the first circuit portion and the second circuit portion of the second drive circuit 52.

Figure 16:
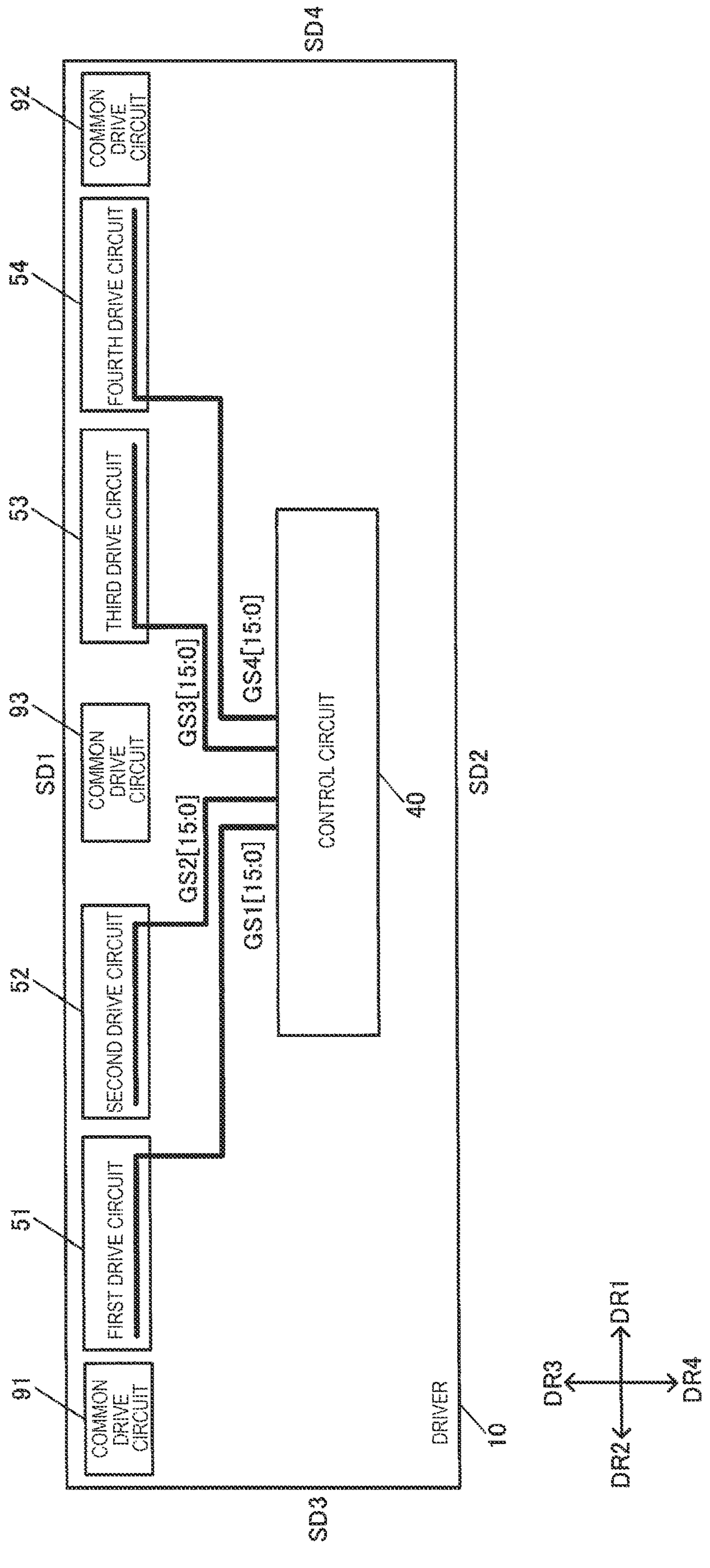
FIG. 16 is a diagram showing a fourth layout arrangement example of the driver.

FIG. 16 shows a fourth layout arrangement example of the driver 10. In the fourth layout arrangement example, the first drive circuit 51, the second drive circuit 52, a third drive circuit 53, and a fourth drive circuit 54 are provided to the driver 10. For example, the first drive circuit 51, the second drive circuit 52, the third drive circuit 53, and the fourth drive circuit 54 are arranged along the first direction DR1, and are specifically arranged along the first side SD1 of the driver 10. For example, the common drive circuit 91, the first drive circuit 51, the second drive circuit 52, the common drive circuit 93, the third drive circuit 53, the fourth drive circuit 54, and the common drive circuit 92 are arranged along the first side SD1 in this order. Further, the control circuit 40 outputs the first pulse width signal group GS1, the second pulse width signal group GS2, a third pulse width signal group GS3, and a fourth pulse width signal group GS4 respectively to the first drive circuit 51, the second drive circuit 52, the third drive circuit 53, and the fourth drive circuit 54.

In other words, the driver 10 according to the present embodiment can further include a third terminal group to be coupled to a third segment electrode group of the liquid crystal panel 100, a fourth terminal group to be coupled to a fourth segment electrode group of the liquid crystal panel 100, the third drive circuit 53, and the fourth drive circuit 54. The third segment electrode group not shown is arranged between, for example, the third drive circuit 53 and the first side SD1 of the driver 10, and the fourth segment electrode group not shown is arranged between, for example, the fourth drive circuit 54 and the first side SD1 of the driver 10.

Further, the control circuit 40 outputs the third pulse width signal group SG3 including a plurality of pulse width signals corresponding to the plurality of gray levels, and the fourth pulse width signal group GS4 which includes a plurality of pulse width signals corresponding to the plurality of gray levels, and which is different in correspondence between the gray levels and the pulse widths from the third pulse width signal group GS3. Further, the third drive circuit 53 outputs a third segment drive signal group based on the pulse width signals selected from the third pulse width signal group GS3 in accordance with the gradation data, to the third terminal group. Further, the fourth drive circuit 54 outputs a fourth segment drive signal group based on the pulse width signals selected from the fourth pulse width signal group GS4 in accordance with the gradation data, to the fourth terminal group. The configurations and the operations of the third drive circuit 53 and the fourth drive circuit 54 are substantially the same as those of the first drive circuit 51 and the second drive circuit 52 except the point that the third pulse width signal group GS3 and the fourth pulse width signal group GS4 are supplied instead of the first pulse width signal group GS1 and the second pulse width signal group GS2, respectively, and therefore, the detailed description thereof will be omitted.

As described above, in FIG. 16, the third drive circuit 53 and the fourth drive circuit 54 are further provided to the driver 10 in addition to the first drive circuit 51 and the second drive circuit 52. In this way, it becomes possible to make the pulse width in the PWM drive different between the first segment electrode group 101 driven by the first drive circuit 51, the second segment electrode group 102 driven by the second drive circuit 52, the third segment electrode group driven by the third drive circuit 53, and the fourth segment electrode group driven by the fourth drive circuit 54 even when using the same gradation data. Thus, it becomes possible to make the setting of the gradation density with respect to the gradation data different between the area of the first segment electrode group 101, the area of the second segment electrode group 102, an area of the third segment electrode group, and an area of the fourth segment electrode group.

Further, in FIG. 16, the first pulse width signal group GS1, the second pulse width signal group GS2, the third pulse width signal group GS3, and the fourth pulse width signal group GS4 are coupled to the first drive circuit 51 and the second drive circuit 52 located at the left side from the control circuit 40 and the third drive circuit 53 and the fourth drive circuit 54 located at the right side with respective wiring lines different from each other. Further, it is arranged that it is possible to set the gradation density to the first drive circuit 51, the second drive circuit 52, the third drive circuit 53, and the fourth drive circuit 54 independently of each other with respect to the same gradation data.

Figure 17:
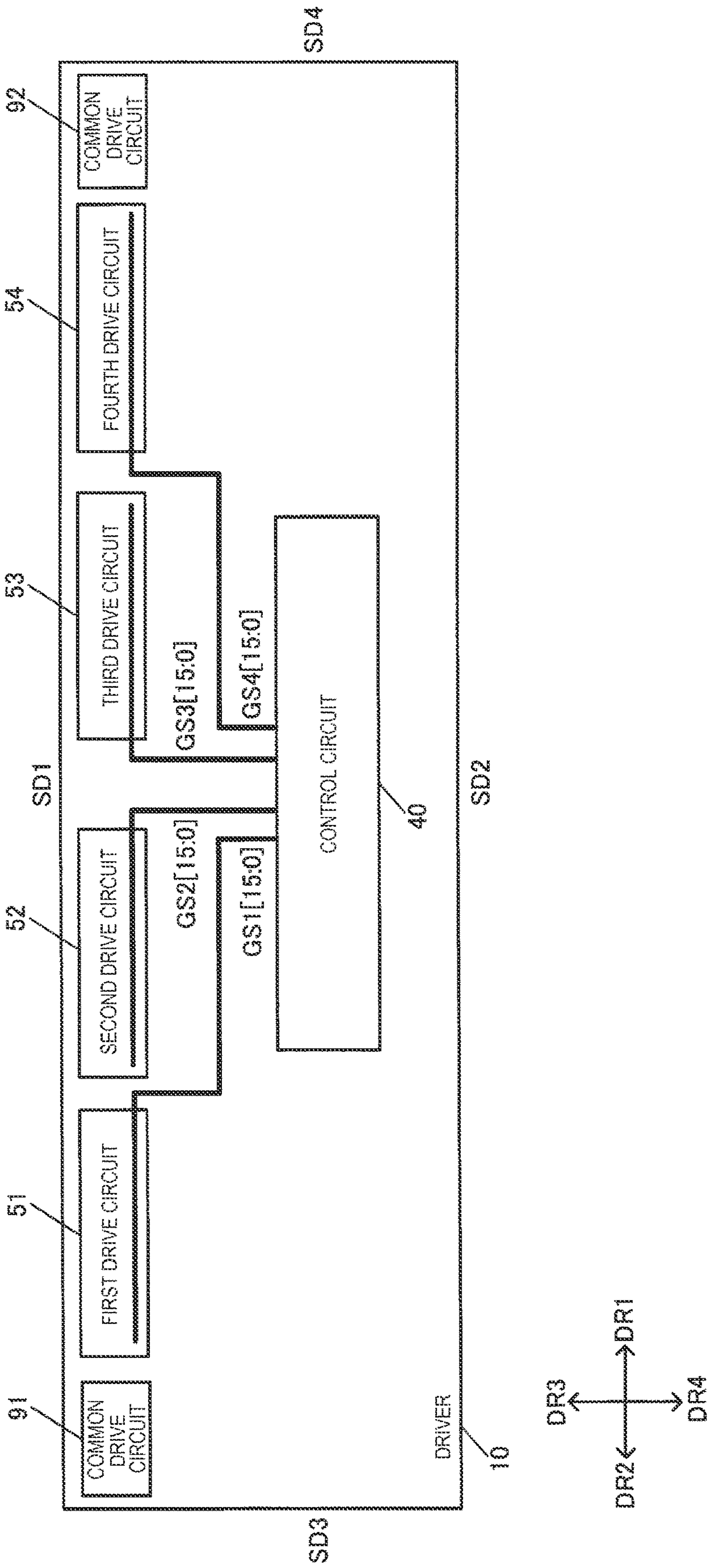
FIG. 17 is a diagram showing a fifth layout arrangement example of the driver.

FIG. 17 shows a fifth layout arrangement example of the driver 10. FIG. 17 is different from FIG. 16 in the point that the common drive circuit 93 is not disposed between the first drive circuit 51 and the second drive circuit 52 in FIG. 17. When disposing the first drive circuit 51 through the fourth drive circuit 54 in such a manner, a variety of types of modified implementation can be made as the layout arrangement of the common drive circuit.

Figure 18:
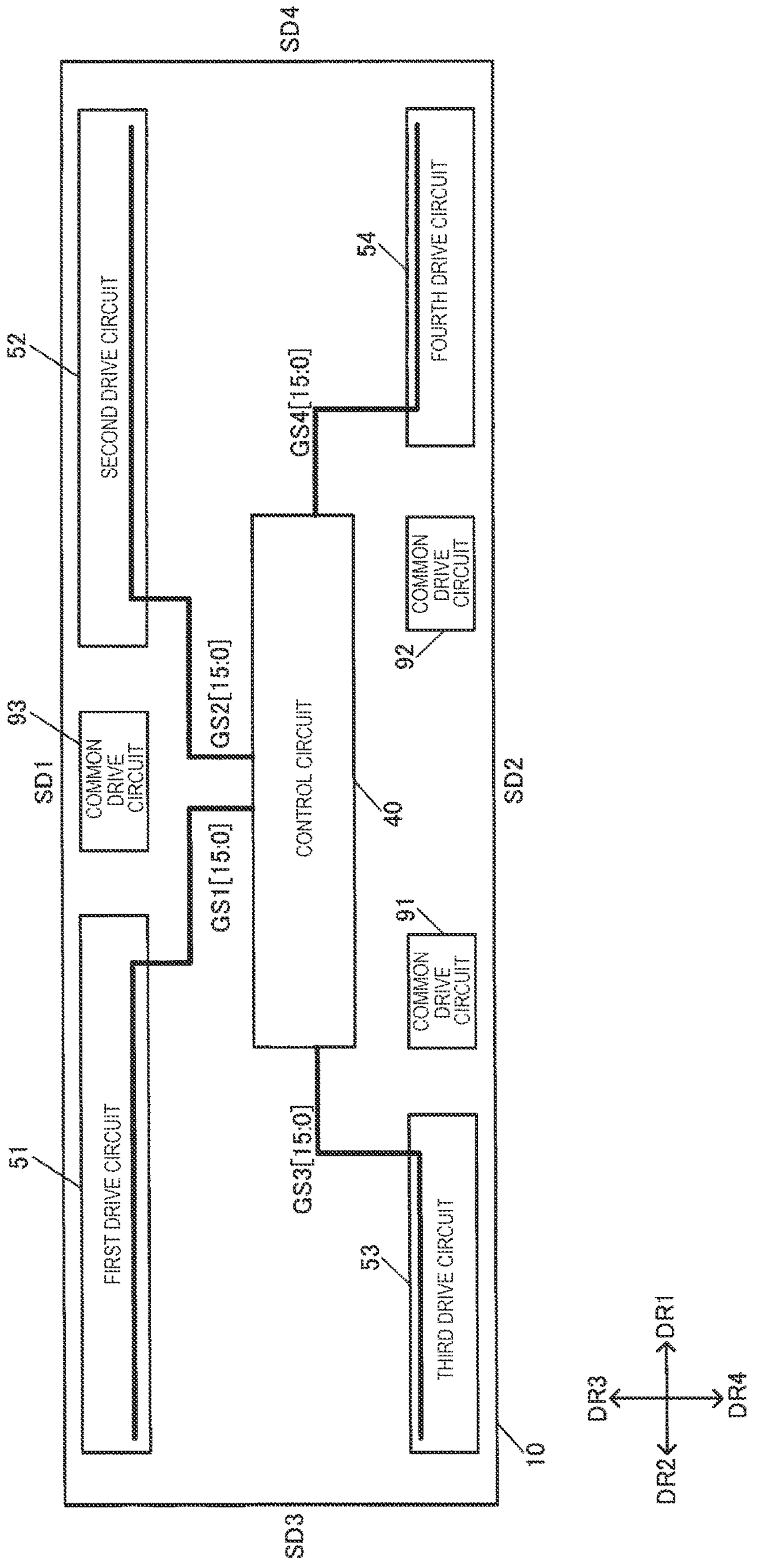
FIG. 18 is a diagram showing a sixth layout arrangement example of the driver.

FIG. 18 shows a sixth layout arrangement example of the driver 10. In FIG. 18, the first drive circuit 51 and the second drive circuit 52 are arranged along the first side SD1 as the long side of the driver 10, and the third drive circuit 53 and the fourth drive circuit 54 are arranged along the second side SD2 as the long side opposed to the first side SD1 of the driver 10. For example, in FIG. 18, the first drive circuit 51, the common drive circuit 93, and the second drive circuit 52 are arranged along the first side SD1 of the driver 10 in this order. Further, the third drive circuit 53, the common drive circuit 91, the common drive circuit 92, and the fourth drive circuit 54 are arranged along the second side SD2 of the driver 10 in this order. The control circuit 40 is arranged in a third arrangement area located between a first arrangement area and a second arrangement area, wherein the first arrangement area is located at the first side SD1 side, the first drive circuit 51 and the second drive circuit 52 are arranged in the first arrangement area, the second arrangement area is located at the second side SD2 side, and the third drive circuit 53 and the fourth drive circuit 54 are arranged in the second arrangement area.

In this way, it becomes possible for the first drive circuit 51 and the second drive circuit 52 to output the first segment drive signal group SG1 based on the first pulse width signal group GS1 and the second segment drive signal group SG2 based on the second pulse width signal group GS2 from the first side SD1 side of the driver 10. Meanwhile, it becomes possible for the third drive circuit 53 and the fourth drive circuit 54 to output the third segment drive signal group based on the third pulse width signal group GS3 and the fourth segment drive signal group based on the fourth pulse width signal group GS4 from the second side SD2 side of the driver 10.

Figure 19:
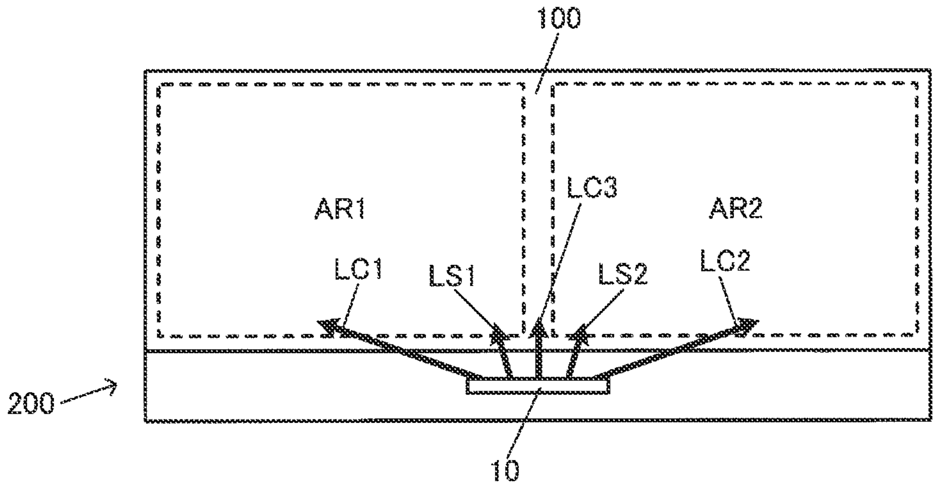
FIG. 19 is a diagram showing a first panel wiring example of the liquid crystal panel.

Then, a panel wiring example in the liquid crystal panel 100 will be described. FIG. 19 shows a first panel wiring example corresponding to the first layout arrangement of the driver 10 shown in FIG. 13. In FIG. 19, a segment drive signal line LS1 from the first drive circuit 51 of the driver 10 is laid from the driver 10 to a first area AR1 of the liquid crystal panel 100. The first segment electrode group 101 shown in FIG. 1 is an electrode group arranged in the first area AR1 of the liquid crystal panel 100. Further, a segment drive signal line LS2 from the second drive circuit 52 of the driver 10 is laid from the driver 10 to a second area AR2 of the liquid crystal panel 100. The second segment electrode group 102 shown in FIG. 1 is an electrode group arranged in the second area AR2 of the liquid crystal panel 100.

Further, in FIG. 19, common drive signal lines LC1, LC2, and LC3 are respectively laid from the common drive circuits 91, 92, and 93 to the liquid crystal panel 100. It should be noted that it is possible to couple all of the common drive signal lines LC1, LC2, and LC3 to the liquid crystal panel 100, or it is also possible to couple just one or two of the common drive signal lines LC1, LC2, and LC3 to the liquid crystal panel 100. The same applies to FIG. 20 through FIG. 24 described later.

Figure 20:
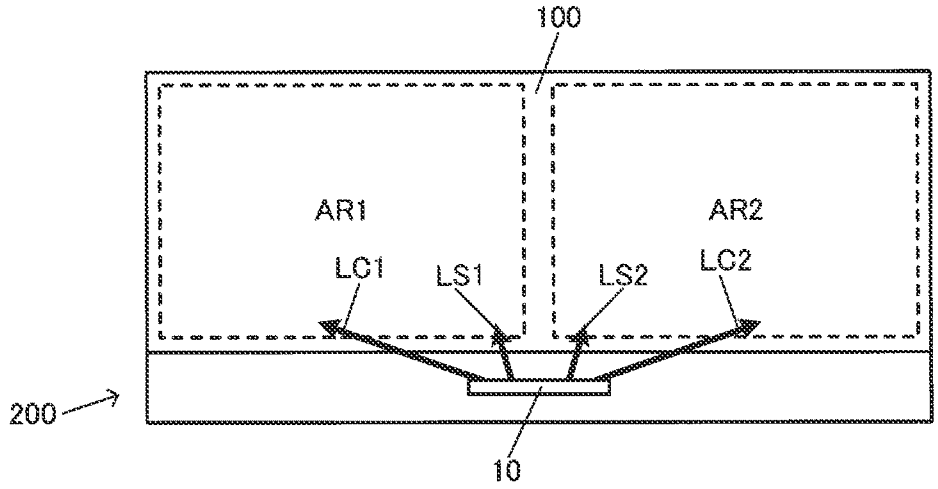
FIG. 20 is a diagram showing a second panel wiring example of the liquid crystal panel.

FIG. 20 shows a second panel wiring example corresponding to the second layout arrangement of the driver 10 shown in FIG. 14. In FIG. 14, since the common drive circuit is not disposed between the first drive circuit 51 and the second drive circuit 52, the common drive signal line LC3 shown in FIG. 19 is not laid also in FIG. 20.

Figure 21:
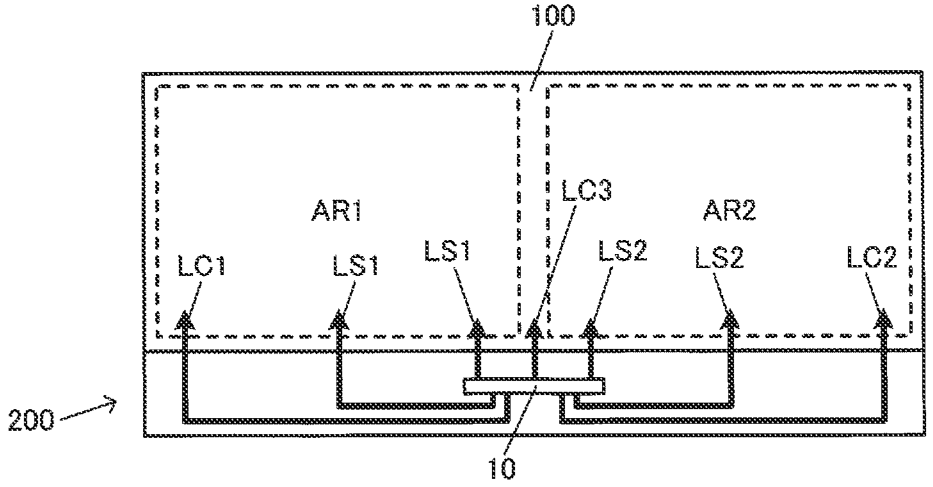
FIG. 21 is a diagram showing a third panel wiring example of the liquid crystal panel.

FIG. 21 shows a third panel wiring example corresponding to the third layout arrangement of the driver 10 shown in FIG. 15. In FIG. 15, the first drive circuit 51 and the second drive circuit 52 are arranged along the first side SD1 of the driver 10, and at the same time, also arranged along the second side SD2. Thus, the segment drive signal line LS1 from the first drive circuit 51 is laid from both of the first side SD1 and the second side SD2 of the driver 10 to the first area AR1 of the liquid crystal panel 100. Further, the segment drive signal line LS2 from the second drive circuit 52 is laid from both of the first side SD1 and the second side SD2 of the driver 10 to the second area AR2 of the liquid crystal panel 100.

As described above, in FIG. 19, FIG. 20, and FIG. 21, the first segment electrode group 101 driven by the first drive circuit 51 is an electrode group arranged in the first area AR1 of the liquid crystal panel 100, and the second segment electrode group 102 driven by the second drive circuit 52 is an electrode group arranged in the second area AR2 of the liquid crystal panel 100. In this way, it becomes possible to make the setting of the gradation density of the segment electrode group with respect to the gradation data different between the first area AR1 and the second area AR2 of the liquid crystal panel 100. Therefore, it becomes possible to set the gradation density individually in each of the first area AR1 and the second area AR2. As a result, when the luminance is different by the area on the liquid crystal panel 100 in some cases even at the same gray level due to the light unevenness of the backlight 120 or the ambient environment such as the outside light, it becomes possible to adjust the luminance by setting the gradation density in each of the areas.

Figure 22:
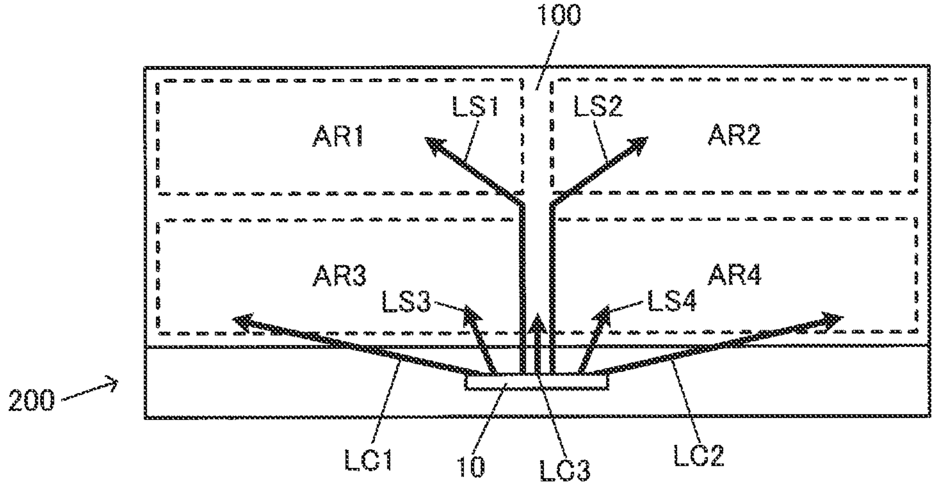
FIG. 22 is a diagram showing a fourth panel wiring example of the liquid crystal panel.

FIG. 22 shows a fourth panel wiring example corresponding to the fourth layout arrangement of the driver 10 shown in FIG. 16. In FIG. 22, the segment drive signal lines LS1, LS2, LS3, and LS4 from the first drive circuit 51, the second drive circuit 52, the third drive circuit 53, and the fourth drive circuit 54 of the driver 10 are laid from the driver 10 to the areas AR1, AR2, AR3, and AR4, respectively. In the first area AR1, the second area AR2, the third area AR3, and the fourth area AR4, there are arranged the first segment electrode group 101, the second segment electrode group 102, the third segment electrode group, and the fourth segment electrode group, respectively. Further, in FIG. 22, the common drive signal lines LC1, LC2, and LC3 are respectively laid from the common drive circuits 91, 92, and 93 to the liquid crystal panel 100.

Figure 23:
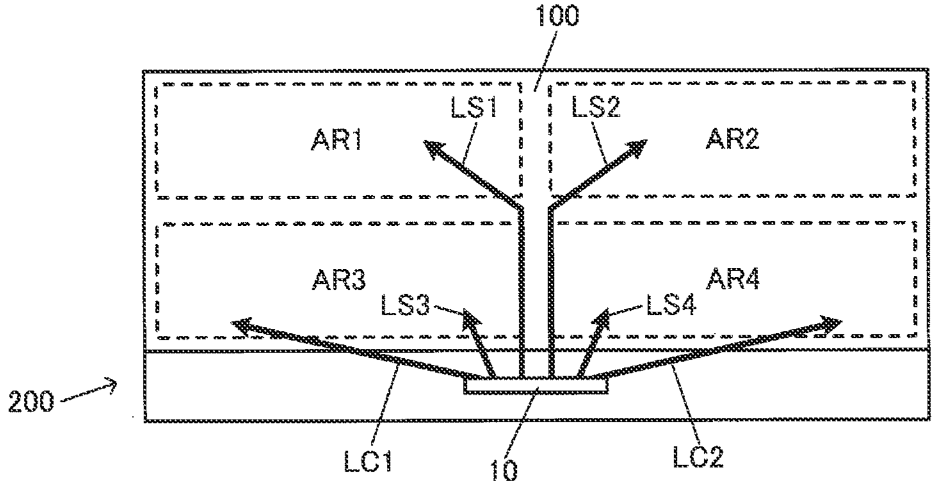
FIG. 23 is a diagram showing a fifth panel wiring example of the liquid crystal panel.

FIG. 23 shows a fifth panel wiring example corresponding to the fifth layout arrangement of the driver 10 shown in FIG. 17. In FIG. 17, since the common drive circuit 93 is not disposed between the first drive circuit 51 and the second drive circuit 52, and between the third drive circuit 53 and the fourth drive circuit 54, the common drive signal line LC3 shown in FIG. 22 is not laid also in FIG. 23.

Figure 24:
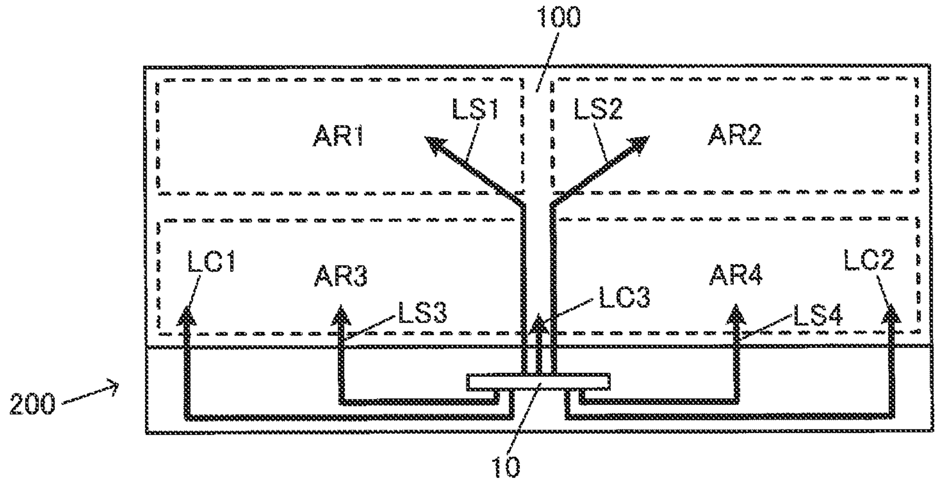
FIG. 24 is a diagram showing a sixth panel wiring example of the liquid crystal panel.

FIG. 24 shows a sixth panel wiring example corresponding to the sixth layout arrangement of the driver 10 shown in FIG. 18. In FIG. 18, the first drive circuit 51 and the second drive circuit 52 are arranged along the first side SD1 of the driver 10, and the third drive circuit 53 and the fourth drive circuit 54 are arranged along the second side SD2 of the driver 10. Thus, the segment drive signal lines LS1, LS2 from the first drive circuit 51 and the second drive circuit 52 are laid from the first side SD1 of the driver 10 to the first area AR1 and the second area AR2 of the liquid crystal panel 100. Further, the segment drive signal lines LS3, LS4 from the third drive circuit 53 and the fourth drive circuit 54 are laid from the second side SD2 of the driver 10 to the third area AR3 and the fourth area AR4 of the liquid crystal panel 100. Thus, it becomes possible to lay the wiring lines for a number of segment drive signals from the first drive circuit 51 through the fourth drive circuits 54 to the liquid crystal panel 100 using both of the long sides, namely the first side SD1 and the second side SD2, of the driver 10.

As described above, in FIG. 22, FIG. 23, and FIG. 24, the first segment electrode group 101 driven by the first drive circuit 51 is the electrode group arranged in the first area AR1 of the liquid crystal panel 100, and the second segment electrode group 102 driven by the second drive circuit 52 is the electrode group arranged in the second area AR2 of the liquid crystal panel 100. Further, the third segment electrode group driven by the third drive circuit 53 is an electrode group arranged in the third area AR3 of the liquid crystal panel 100, and the fourth segment electrode group driven by the fourth drive circuit 54 is an electrode group arranged in the fourth area AR4 of the liquid crystal panel 100. In this way, it becomes possible to make the setting of the gradation density of the segment electrode group with respect to the gradation data different between the first area AR1, the second area AR2, the third area AR3, and the fourth area AR4 of the liquid crystal panel 100. Therefore, it becomes possible to set the gradation density individually in each of the first area AR1, the second area AR2, the third area AR3, and the fourth area AR4. As a result, when the luminance is different by the area on the liquid crystal panel 100 in some cases even at the same gray level due to the light unevenness of the backlight 120 or the ambient environment such as the outside light, it becomes possible to adjust the luminance by setting the gradation density in each of the areas.

Figure 25:
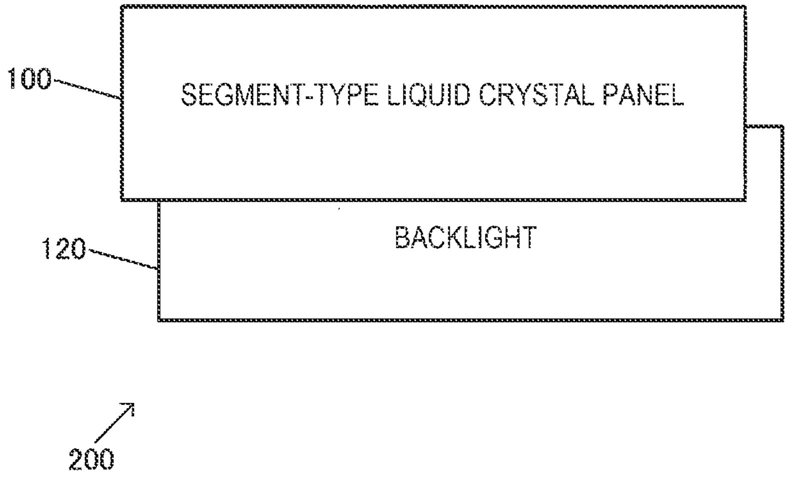
FIG. 25 is a diagram showing a configuration example of an electro-optic device.
Figure 26:
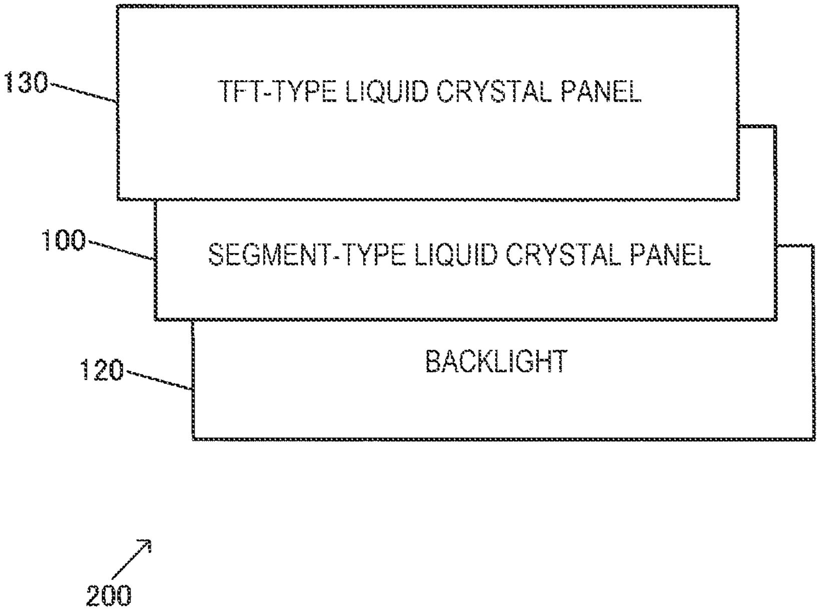
FIG. 26 is a diagram showing a configuration example of the electro-optic device.

FIG. 25 and FIG. 26 are each a diagram showing a configuration example of an electro-optic device 200 according to the present embodiment. In FIG. 25, the backlight 120 is disposed at the back side of the liquid crystal panel 100 of the segment type. The backlight 120 can be the edge light type, or can also be the direct type. According to the electro-optic device 200 shown in FIG. 25, it becomes possible to achieve the gradation display of a normal segment image. The electro-optic device 200 can be used as a cluster meter of a vehicle, a bike, or the like.

In FIG. 26, the liquid crystal panel 100 of the segment type is arranged at the back side of a liquid crystal panel 130 of the TFT type. Alternatively, it is possible to arrange the liquid crystal panel 100 of the segment type at the front side of the liquid crystal panel 130 of the TFT type. In the backlight 120, there are arranged a plurality of light emitting elements such as LEDs in, for example, a reticular pattern. Further, an amount of transmitted light of the backlight 120 is controlled, and thus, a display quality or the like of the display of the liquid crystal panel 130 of the TFT type is controlled.

As described hereinabove, the driver according to the present embodiment is a driver configured to drive a liquid crystal panel with a static drive system, including a first terminal group to be coupled to a first segment electrode group of the liquid crystal panel, and a second terminal group to be coupled to a second segment electrode group of the liquid crystal panel. Further, the driver includes a control circuit configured to output a first pulse width signal group including a plurality of pulse width signals corresponding to a plurality of gray levels, and a second pulse width signal group which includes a plurality of pulse width signals corresponding to the plurality of gray levels, and which is different in correspondence between gray levels and pulse widths from the first pulse width signal group. Further, the driver includes a first drive circuit configured to output a first segment drive signal group based on pulse width signals selected from the first pulse width signal group in accordance with gradation data for setting the plurality of gray levels, to the first terminal group, and a second drive circuit configured to output a second segment drive signal group based on pulse width signals selected from the second pulse width signal group in accordance with the gradation data, to the second terminal group.

According to the present embodiment, the first segment electrode group of the liquid crystal panel becomes to be driven by the first segment drive signal group generated based on the gradation data and the first pulse width signal group. Further, the second segment electrode group of the liquid crystal panel becomes to be driven by the second segment drive signal group generated based on the gradation data and the second pulse width signal group. Further, the first pulse width signal group and the second pulse width signal group are made different in correspondence between the gray levels set by the gradation data and the pulse widths of the respective pulse width signals from each other. Therefore, it becomes possible to make the pulse width in the PWM drive different between the first segment electrode group driven by the first drive circuit and the second segment electrode group driven by the second drive circuit even when using the same gradation data, and thus, it becomes possible to achieve an increase of easiness in adjustment of the luminance in each of the areas where the segment electrodes are arranged.

Further, in the present embodiment, there may be included a register unit configured to store first gradation density setting data for setting a correspondence between gray levels and pulse widths in the first pulse width signal group, and second gradation density setting data for setting a correspondence between gray levels and pulse widths in the second pulse width signal group. Further, the control circuit may output the first pulse width signal group based on the first gradation density setting data stored in the register unit, and may output the second pulse width signal group based on the second gradation density setting data stored in the register unit.

In this way, it becomes possible for the control circuit to output the first pulse width signal group and the second pulse width signal group different in correspondence between the gray levels and the pulse widths from each other respectively to the first drive circuit and the second drive circuit using the first gradation density setting data and the second gradation density setting data stored in the register unit.

Further, in the present embodiment, there may be included an interface circuit configured to receive the first gradation density setting data and the second gradation density setting data.

In this way, it becomes possible for the control circuit to generate the first pulse width signal group and the second pulse width signal group based on the first gradation density setting data and the second gradation density setting data received via the interface circuit, and then output the first pulse width signal group and the second pulse width signal group to the first drive circuit and the second drive circuit.

Further, in the present embodiment, the first drive circuit may include a first selection circuit to which the first pulse width signal group is input, and which selects a pulse width signal corresponding to the gradation data from the first pulse width signal group, and the second drive circuit may include a second selection circuit to which the second pulse width signal group is input, and which selects a pulse width signal corresponding to the gradation data from the second pulse width signal group.

In this way, by the first selection circuit and the second selection circuit selecting the pulse width signal corresponding to the gradation data from the first pulse width signal group and the second pulse width signal group, it becomes possible for the first drive circuit and the second drive circuit to output the first segment drive signal group and the second segment drive signal group, respectively.

Further, in the present embodiment, when defining a long side direction of the driver as a first direction, the first drive circuit and the second drive circuit may be arranged along the first direction.

In this way, it becomes possible to couple the wiring lines of the first segment drive signals and the second segment drive signals from the first drive circuit and the second drive circuit to the first segment electrode group arranged in the first area of the liquid crystal panel and the second segment electrode group arranged in the second area along short paths, respectively.

Further, in the present embodiment, there may further be included a first common drive circuit configured to output a first common drive signal, and a second common drive circuit configured to output a second common drive signal. Further, when defining an opposite direction to the first direction as a second direction, the first common drive circuit may be arranged at the second direction side of the first drive circuit, and the second common drive circuit may be arranged at the first direction side of the second drive circuit.

In this way, it becomes possible to supply the first common drive signal from the first common drive circuit and the second common drive signal from the second common drive circuit to the common electrode opposed to the first segment electrode group and the second segment electrode group driven by the first drive circuit and the second drive circuit with the wiring lines along short paths, respectively.

Further, in the present embodiment, there may further be included a common drive circuit configured to output a common drive signal, wherein the common drive circuit may be arranged between the first drive circuit and the second drive circuit.

In this way, it becomes possible to supply the common drive signal from the common drive circuit to the common electrode opposed to the first segment electrode group driven by the first drive circuit, and the common electrode opposed to the second segment electrode group driven by the second drive circuit with the wiring line along a short path.

Further, in the present embodiment, the first drive circuit and the second drive circuit may be arranged along a first side as a long side of the driver, and the control circuit may be arranged between the first drive circuit or the second drive circuit, and a second side as a long side opposed to the first side of the driver.

In this way, it becomes possible to lay wiring lines for the first pulse width signal group from the control circuit to the first drive circuit along short paths, and to lay wiring lines for the second pulse width signal group from the control circuit to the second drive circuit along short paths.

Further, in the present embodiment, the first segment electrode group may be an electrode group arranged in a first area of the liquid crystal panel, and the second segment electrode group may be an electrode group arranged in a second area of the liquid crystal panel.

In this way, it becomes possible to make the setting of the gradation density of the segment electrode group with respect to the gradation data different between the first area and the second area of the liquid crystal panel.

Further, in the present embodiment, there may further be included a third terminal group to be coupled to a third segment electrode group of the liquid crystal panel, a fourth terminal group to be coupled to a fourth segment electrode group of the liquid crystal panel, a third drive circuit, and a fourth drive circuit. Further, the control circuit may be configured to output a third pulse width signal group including a plurality of pulse width signals corresponding to the plurality of gray levels, and a fourth pulse width signal group which includes a plurality of pulse width signals corresponding to the plurality of gray levels, and which is different in correspondence between gray levels and pulse widths from the third pulse width signal group. Further, the third drive circuit may output a third segment drive signal group based on pulse width signals selected from the third pulse width signal group in accordance with the gradation data, to the third terminal group, and the fourth drive circuit may output a fourth segment drive signal group based on pulse width signals selected from the fourth pulse width signal group in accordance with the gradation data, to the fourth terminal group.

In this way, it becomes possible to make the pulse width in the PWM drive different between the first segment electrode group driven by the first drive circuit, the second segment electrode group driven by the second drive circuit, the third segment electrode group driven by the third drive circuit, and the fourth segment electrode group driven by the fourth drive circuit even when using the same gradation data.

Further, in the present embodiment, the first drive circuit and the second drive circuit may be arranged along a first side as a long side of the driver, and the third drive circuit and the fourth drive circuit may be arranged along a second side as a long side opposed to the first side of the driver.

In this way, it becomes possible for the first drive circuit and the second drive circuit to output the first segment drive signal group based on the first pulse width signal group and the second segment drive signal group based on the second pulse width signal group from the first side of the driver. Meanwhile, it becomes possible for the third drive circuit and the fourth drive circuit to output the third segment drive signal group based on the third pulse width signal group and the fourth segment drive signal group based on the fourth pulse width signal group from the second side of the driver.

Further, in the present embodiment, the first segment electrode group may be an electrode group arranged in a first area of the liquid crystal panel, the second segment electrode group may be an electrode group arranged in a second area of the liquid crystal panel, the third segment electrode group may be an electrode group arranged in a third area of the liquid crystal panel, and the fourth segment electrode group may be an electrode group arranged in a fourth area of the liquid crystal panel.

In this way, it becomes possible to make the setting of the gradation density of the segment electrode group with respect to the gradation data different between the first area, the second area, the third area, and the fourth area of the liquid crystal panel.

Further, the electro-optic device according to the present embodiment may include the driver described above, a liquid crystal panel, and a backlight for the liquid crystal panel.

It should be noted that although the present embodiment is hereinabove described in detail, it should easily be understood by those skilled in the art that it is possible to make a variety of modifications not substantially departing from the novel matters and the advantages of the present disclosure. Therefore, all of such modified examples should be included in the scope of the present disclosure. For example, a term described at least once with a different term having a broader sense or the same meaning in the specification or the accompanying drawings can be replaced with that different term in any part of the specification or the accompanying drawings. Further, all of the combinations of the present embodiment and the modified examples are also included in the scope of the present disclosure. Further, the configurations and the operations of the driver, the electro-optic device, the liquid crystal panel, and so on are not limited to those described in the present embodiment, and can be implemented with a variety of modifications.

What is claimed is:

1. A driver configured to drive a liquid crystal panel with a static drive system, comprising:

a first terminal group to be coupled to a first segment electrode group of the liquid crystal panel;

a second terminal group to be coupled to a second segment electrode group of the liquid crystal panel;

a control circuit configured to output a first pulse width signal group including a plurality of pulse width signals corresponding to a plurality of gray levels, and a second pulse width signal group which includes a plurality of pulse width signals corresponding to the plurality of gray levels, and which is different in correspondence between gray levels and pulse widths from the first pulse width signal group;

a first drive circuit configured to output a first segment drive signal group based on pulse width signals selected from the first pulse width signal group in accordance with gradation data for setting the plurality of gray levels, to the first terminal group; and a second drive circuit configured to output a second segment drive signal group based on pulse width signals selected from the second pulse width signal group in accordance with the gradation data, to the second terminal group.

2. The driver according to claim 1, further comprising:

a register unit configured to store first gradation density setting data for setting a correspondence between gray levels and pulse widths in the first pulse width signal group, and second gradation density setting data for setting a correspondence between gray levels and pulse widths in the second pulse width signal group, wherein the control circuit is configured to output the first pulse width signal group based on the first gradation density setting data stored in the register unit, and output the second pulse width signal group based on the second gradation density setting data stored in the register unit.

3. The driver according to claim 2, further comprising:

an interface circuit configured to receive the first gradation density setting data and the second gradation density setting data.

4. The driver according to claim 1, wherein the first drive circuit includes a first selection circuit to which the first pulse width signal group is input, and which selects a pulse width signal corresponding to the gradation data from the first pulse width signal group, and the second drive circuit includes a second selection circuit to which the second pulse width signal group is input, and which selects a pulse width signal corresponding to the gradation data from the second pulse width signal group.

5. The driver according to claim 1, wherein when defining a long side direction of the driver as a first direction, the first drive circuit and the second drive circuit are arranged along the first direction.

6. The driver according to claim 5, further comprising:

a first common drive circuit configured to output a first common drive signal; and a second common drive circuit configured to output a second common drive signal, wherein when defining an opposite direction to the first direction as a second direction, the first common drive circuit is arranged at the second direction side of the first drive circuit, and the second common drive circuit is arranged at the first direction side of the second drive circuit.

7. The driver according to claim 5, further comprising:

a common drive circuit configured to output a common drive signal, wherein the common drive circuit is arranged between the first drive circuit and the second drive circuit.

8. The driver according to claim 1, wherein the first drive circuit and the second drive circuit are arranged along a first side as a long side of the driver, and the control circuit is arranged between the first drive circuit or the second drive circuit, and a second side as a long side opposed to the first side of the driver.

9. The driver according to claim 1, wherein the first segment electrode group is an electrode group arranged in a first area of the liquid crystal panel, and the second segment electrode group is an electrode group arranged in a second area of the liquid crystal panel.

10. The driver according to claim 1, further comprising:

a third terminal group to be coupled to a third segment electrode group of the liquid crystal panel;

a fourth terminal group to be coupled to a fourth segment electrode group of the liquid crystal panel;

a third drive circuit; and a fourth drive circuit, wherein the control circuit is configured to output a third pulse width signal group including a plurality of pulse width signals corresponding to the plurality of gray levels, and a fourth pulse width signal group which includes a plurality of pulse width signals corresponding to the plurality of gray levels, and which is different in correspondence between gray levels and pulse widths from the third pulse width signal group, the third drive circuit outputs a third segment drive signal group based on pulse width signals selected from the third pulse width signal group in accordance with the gradation data, to the third terminal group, and the fourth drive circuit outputs a fourth segment drive signal group based on pulse width signals selected from the fourth pulse width signal group in accordance with the gradation data, to the fourth terminal group.

11. The driver according to claim 10, wherein the first drive circuit and the second drive circuit are arranged along a first side as a long side of the driver, and the third drive circuit and the fourth drive circuit are arranged along a second side as a long side opposed to the first side of the driver.

12. The driver according to claim 10, wherein the first segment electrode group is an electrode group arranged in a first area of the liquid crystal panel, the second segment electrode group is an electrode group arranged in a second area of the liquid crystal panel, the third segment electrode group is an electrode group arranged in a third area of the liquid crystal panel, and the fourth segment electrode group is an electrode group arranged in a fourth area of the liquid crystal panel.

13. An electro-optic device comprising:

the driver according to claim 1;

the liquid crystal panel; and a backlight for the liquid crystal panel.

* * * * *